3,483,293
METHOD FOR CONTROLLING BIRDS
AND RODENTS
Gordon W. Duncan, Kalamazoo, and Daniel Lednicer,
Portage, Mich., assignors to The Upjohn Company,
Kalamazoo, Mich., a corporation of Delaware
No Drawing. Continuation-in-part of application Ser. No.
358,612, Apr. 9, 1964. This application Dec. 15, 1967,
Ser. No. 690,754
Int. Cl. A01n 17/14, 9/22, 9/20
U.S. Cl. 424—274                                     5 Claims

ABSTRACT OF THE DISCLOSURE

A method for controlling the population of birds and rodents by placing a composition in their feeding habitats, the active ingredient of said composition being selected from the class consisting of the free bases, the N-oxides and salts of compounds having the formula:

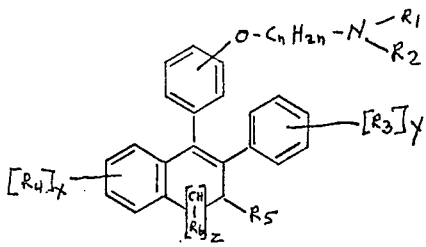

CROSS REFERENCES TO RELATED APPLICATIONS

This application is a continuation-in-part of copending application Ser. No. 358,612 filed Apr. 9, 1964, now abandoned.

BRIEF SUMMARY OF INVENTION

This invention relates to a method for the control or management of bird and rodent populations.

Man has made many changes in his environment to suit his own purposes. The ecological consequences of his actions are many. Among them is the location and number of birds in areas where their presence can result in serious danger or economic loss. Birds are known to be carriers of infectious organisms and have been responsible for several airplane crashes. In addition, birds deface many buildings and consume a good deal of our agricultural output. It is, therefore, desirable to provide means to control or manage the population of birds. The composition and method of this invention provide such means.

The composition used in the method of the present invention comprises a feed carrier and an active ingredient. The method comprises the placement of the composition in the feeding habitats of birds in an amount sufficient to provide a means for sublethal population management. More particularly, the population can be controlled to eradicate all birds or maintain a desired number. The mechanism whereby the composition reduces or controls the population is not known but antifertility activity has been the hypothesis followed.

The active ingredients of the composition are selected from the class consisting of (a) the free bases, (b) the pharmacologically acceptable acid addition salts, (c) the N-oxides, (d) the N-oxide pharmacologically acceptable acid addition salts, and (e) the quaternary ammonium salts of compounds having the formula:

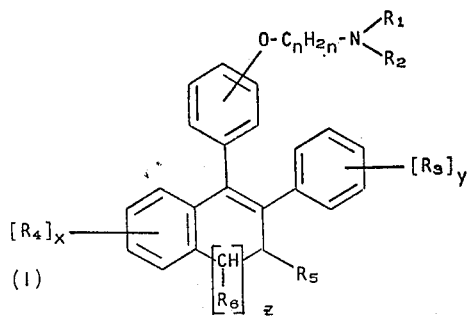

wherein $R_1$ and $R_2$ are selected from the class consisting of lower-alkyl and lower-alkyl linked together to form a 5 to 7 ring atom saturated heterocyclic radical, one of the ring atoms of which, in addition to the amino nitrogen atom, is selected from the class consisting of carbon, nitrogen, and oxygen, the other ring atoms being carbon, $R_3$ and $R_4$ are selected from the class consisting of trifluoromethyl, lower-alkyl, lower alkenyl, hydroxy, lower-alkoxy, lower alkenyloxy, aryloxy from 6 to 12 carbon atoms, inclusive, halogen, lower-alkyl mercapto, and arylmercapto from 6 to 12 carbon atoms, inclusive, $C_nH_{2n}$ represents an alkylene group from 2 to 6 carbon atoms, inclusive, $x$ and $y$ are integers from 0 to 4, inclusive, $R_5$ and $R_6$ are selected from the class consisting of hydrogen and lower-alkyl, and $z$ is an integer from 0 to 1, inclusive.

DETAILED DESCRIPTION

The term "lower-alkyl" means an alkyl group containing from 1 to 8 carbon atoms, inclusive, such as methyl, ethyl, propyl, butyl, amyl, hexyl, heptyl, octyl, and isomeric forms thereof. The term "lower-alkenyl" means an alkenyl group containing from 2 to 8 carbon atoms, inclusive, such as vinyl, allyl, butenyl, pentenyl, hexenyl, heptenyl, octenyl, and isomeric forms thereof. The term "lower-alkoxy" means an alkoxy group containing from 1 to 8 carbon atoms, inclusive, such as methoxy, ethoxy, propoxy, butoxy, amyloxy, hexyloxy, heptyloxy, octyloxy, and isomeric forms thereof. The term "lower-alkenyloxy" means an alkenyloxy group containing from 2 to 8 carbon atoms, inclusive, such as vinyloxy, allyloxy, butenyloxy, pentenyloxy, hexenyloxy, heptenyloxy, octenyloxy, and isomeric forms thereof. The term "aryloxy from 6 to 12 carbon atoms, inclusive" includes phenoxy, tolyloxy, xylyloxy, naphthyloxy, biphenylyloxy, and the like. The term "halogen" is inclusive of fluorine, chlorine, bromine, and iodine. The term "lower-alkylmercapto" means an alkylmercapto group containing from 1 to 8 carbon atoms, inclusive, such as methylmercapto, ethylmercapto, propylmercapto, butylmercapto, amylmercapto, hexylmercapto, heptylmercapto, octylmercapto, and isomeric forms thereof. The term "arylmercapto from 6 to 12 carbon atoms, inclusive" includes phenylmercapto, tolylmercapto, xylylmercapto, naphthylmercapto, biphenylylmercapto, and the like. The term "alkylene group from 2 to 6 carbon atoms, inclusive" includes ethylene, propylene, butylene, amylene, hexylene, and isomeric forms thereof.

The term "lower alkyl groups linked together to form a 5 to 7 ring atom saturated heterocyclic radical, one of the ring atoms of which, in addition to the amino nitrogen atoms, is selected from the class consisting of carbon, nitrogen, and oxygen, the other ring atoms being carbon" is inclusive of pyrrolidino, 2-methylpyrrolidino, 2,2-dimethylpyrrolidino, and like alkylpyrrolidino groups, piperazino, 4-methylpiperazino, 2,4-dimethylpiperazino, and like alkylpiperazino groups, morpholino, piperidino, 2-methylpiperidino, 3-methylpiperidino, and like alkylpiperidino groups, hexamethyleneimino, homopiperazino, homomorpholino, and the like.

The acid addition salts comprise the salts of the compounds having the Formula I and of the corresponding N-oxides with pharmacologically acceptable acids such as sulfuric, hydrochloric, nitric, phosphoric, lactic, benzoic, methanesulfonic, p-toluenesulfonic, salicyclic, acetic, propionic, maleic, malic, tartaric, citric, cyclohexylsulfamic, succinic, nicotinic, ascorbic acids, and the like.

The quaternary ammonium salts are the salts obtained by reacting the free bases having the Formula I with quaternating agents, for example, lower-alkyl halides, lower-alkenyl halides, di(lower-alkyl) sulfates, aralkyl halides, lower-alkyl arylsulfonates, and the like. The term "lower alkyl" has the meaning hereinbefore defined. The term "aralkyl" means an aralkyl group containing from 7 to 13 carbon atoms, inclusive, such as benzyl, phenethyl, phenylpropyl, benzhydryl, and the like. Examples of quaternary salts of the compounds of Formula I are the methobromide, methiodide, ethobromide, propyl chloride, butyl bromide, octyl bromide, methyl methosulfate, ethyl ethosulfate, allyl chloride, allyl bromide, benzyl bromide, benzhydryl chloride, methyl toluenesulfonate, and the like.

The active ingredients of the invention having the Formula I can be prepared by reaction of an appropriately substituted 1-keto-1,2,3,4-tetrahydronaphthalene (i.e., an α-tetralone) or indanone having the formula:

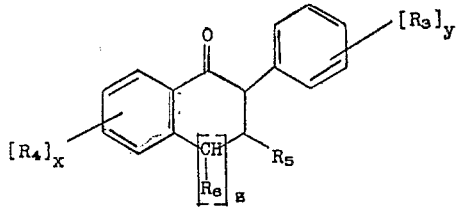

wherein $R_3$, $R_4$, $R_5$, $R_6$, $x$, $y$, and $z$ have the significance hereinbefore defined (with the exception noted below), with a Grignard reagent having the formula:

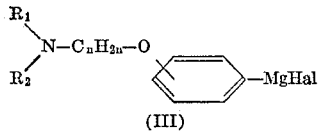

(III)

wherein $R_1$, $R_2$, and $C_nH_{2n}$ have the significance hereinbefore defined and Hal represents a halogen atom. The reaction is carried out advantageously in the presence of an inert solvent under anhydrous conditions in accordance with the established procedure for Grignard reactions. Suitable inert solvents include diisopropyl ether, diisobutyl ether, tetrahydrofuran, and the like. The reaction can be carried out at temperatures within the range of about 0° C. to about the boiling point of the solvent employed and is preferably carried out at elevated temperatures, for example, at or near the boiling point of the reaction mixture.

The reaction time varies within wide limits according to the temperature at which the reaction is conducted. Generally speaking, where the reaction is carried out at elevated temperatures such as the boiling point of the reaction mixture, it is necessary to employ a reaction time of the order of several hours to ensure completion of the reaction.

The desired dihydronaphthalene or indene having the Formula I can be isolated from the reaction mixture by conventional procedures, for example, by decomposing the reaction mixture with water, ammonium chloride, and the like, followed by separation of the organic layer and removal of solvent therefrom. In many cases, the product so obtained is largely the desired compound (I) contaminated with minor impurities and unchanged starting material which can be removed by simple procedures, for example by isolation of the desired compound (I) as an acid addition salt.

However, in some cases a desired 3,4-dihydronaphthalene (I wherein $z=1$) is contaminated with appreciable quantities of the corresponding 1-hydroxy-1,2,3,4-tetrahydronaphthalene having the Formula IV below and in certain cases the reaction product obtained is largely this compound containing only a small amount of the desired compound (I wherein $z=1$).

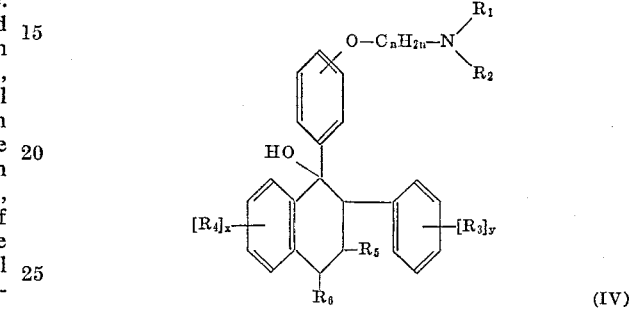

In the above formula $R_1$, $R_2$, $R_3$, $R_4$, $R_5$, $R_6$, $C_nH_{2n}$ and $x$ and $y$ have the significance hereinbefore defined.

The compound (IV), when obtained as the major reaction product or when present in significant quantities in the above-described reaction product, can be converted to the desired compound (I wherein $z=1$) by dehydration. The dehydration can be effected in most instances by heating the compound (IV) in a solvent such as benzene, toluene, xylene, and the like which forms an azeotrope with water, in the presence of a trace of a strong acid such as hydrochloric, sulfuric, p-toluenesulfonic acids and the like. The water which is formed in the dehydration is removed from the reaction mixture azeotropically. There is thereby obtained a solution of the desired compound (I wherein $z=1$) from which the latter can be isolated by evaporation or other conventional procedures.

In certain cases, the dehydration of the 1-hydroxy-1,2,3,4-tetrahydronaphthalene (IV) requires more drastic conditions such as heating the compound at, or slightly above, its melting point, preferably in the presence of an inert gas, until evolution of water is complete.

In other cases a desired indene (I wherein $z=0$) so obtained is contaminated with appreciable quantities of the corresponding indanol which is formed as intermediate in the reaction of the indanone (II) and the Grignard (III) and which is dehydrated to yield the desired indene. Where such a mixture of indene (I wherein $z=0$) and the corresponding indanol is obtained, said mixture can be treated by procedures known to effect the dehydration of a tertiary carbinol whereby the indanol present in the mixture is converted to the desired indene (I wherein $z=0$). A particularly convenient method of effecting the dehydration is to heat the mixture in a solvent such as benzene, toluene, xylene and the like which forms an azeotrope with water, and in the presence of a trace of a strong acid such as hydrochloric, sulfuric, p-toluenesulfonic acids and the like. The water which is formed in the dehydration is removed from the reaction mixture azeotropically. There is thereby obtained a solution of the desired indene (I wherein $z=0$) free from indanol. The indene (I wherein $z=0$) can then be isolated by evaporation of the solvent or by other conventional procedures, for example, extraction with aqueous acid followed by liberation of the free base indene (I wherein $z=0$) by basification of the acid solution.

When either or both of the groups $R_3$ and $R_4$ in the starting α-tetralone or indanone (II) represents free hydroxy, it is necessary, before carrying out the Grignard reaction described above, to protect this group with a radical which can be removed subsequently to yield the desired compound (I) with a free hydroxy group or groups. A particularly convenient manner in which a free hydroxy group or groups in the starting α-tetralone or indanone can be so protected is by conversion to the corresponding tetrahydropyranyl ether. The latter conversion can be accomplished readily by treating the α-tetralone or indanone (II) containing a free hydroxyl group or groups with 2,3-dihydropyran in the presence of a trace of mineral acid such as hydrochloric acid. After the α-tetralone or indanone (II) with hydroxy group or groups protected in this manner has been converted to the corresponding compound (I) by the reaction described above, the tetrahydropyranyl ether can be hydrolyzed, for example, using aqueous mineral acid to liberate the free hydroxy group.

The Grignard reagents having the Formula III which are employed as starting materials in the process of the invention can be prepared by reaction of magnesium in an anhydrous inert organic solvent such as ether, tetrahydrofuran and the like with the appropriately substituted halobenzene having the formula:

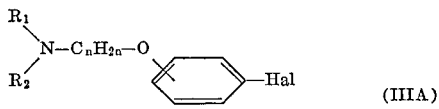
(IIIA)

wherein $R_1$, $R_2$, $C_nH_{2n}$, and Hal have the significance hereinbefore defined, using procedures well known in the art for the preparation of Grignard reagents.

The halobenzenes having the Formula IIIA can be prepared by etherification of the corresponding halophenol with the appropriate tertiaryaminoalkyl halide

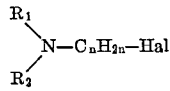

wherein $R_1$, $R_2$, $C_nH_{2n}$, and Hal have the significance hereinbefore defined. The etherification is conducted advantageously in an inert solvent such as a lower alkanol, for example, methanol, ethanol, isopropyl alcohol, and the like in the presence of a base such as potassium bicarbonate, sodium hydroxide, sodium methoxide, and the like.

The tertiaryaminoalkyl halides having the formula

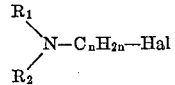

wherein $R_1$, $R_2$, $C_nH_{2n}$, and Hal have the significance hereinbefore defined, employed in the preparation of halobenzenes (IIIA) can themselves be prepared by halogenation of the corresponding tertiaryaminoalkanols, which tertiaryaminoalkanols in turn can be made by interaction of the requisite secondary amine

wherein $R_1$ and $R_2$ have the significance hereinbefore defined, with the appropriate haloalkanol, $$Hal—C_nH_{2n}OH$$

wherein Hal and $C_nH_{2n}$ have the significance hereinbefore defined, in accordance with known methods. The condensation between the secondary amine

and the haloalkanol Hal—$C_nH_{2n}$OH can be carried out, for example, using the procedure described by Moffett, J. Org. Chem., 14, 862, 1949. Alternatively, the desired tertiaryaminoalkanols can be prepared by heating the secondary amine

with the appropriate haloalkanoic acid ester, followed by reduction of the thus-produced aminoalkanoic acid ester with lithium aluminum hydride according to the method described by Moffett, supra.

The conversion of the tertiaryaminoalkanols so obtained to the corresponding tertiaryaminoalkyl halides can be carried out by the use of known halogenating agents such as thionyl bromide, thionyl chloride, phosphorus tribromide, phosphorus trichloride, and the like, using, for example, the procedure described by Moffett et al., J. Am. Chem. Soc., 77, 1565, 1955.

A number of the indanones having the formula (II wherein $z=0$) which are employed as starting materials in the process of the invention are known. The known compounds include 2-phenyl-1-indanone, 5-methoxy-2-(p-methoxyphenyl)-1-indanone, 7-methoxy-2-(p-methoxyphenyl)-1-indanone, 5-methoxy-2-phenyl-1-indanone, 6-methoxy-2-phenyl-1-indanone, 5-isopropoxy-2-phenyl-1-indanone, and 5,6-dimethoxy-2-phenyl-1-indanone.

The starting indanones of formula (II wherein $z=0$), except those in which $R_3$ and $R_4$ represent hydroxy or alkenyloxy, can be prepared conveniently according to the following reaction scheme:

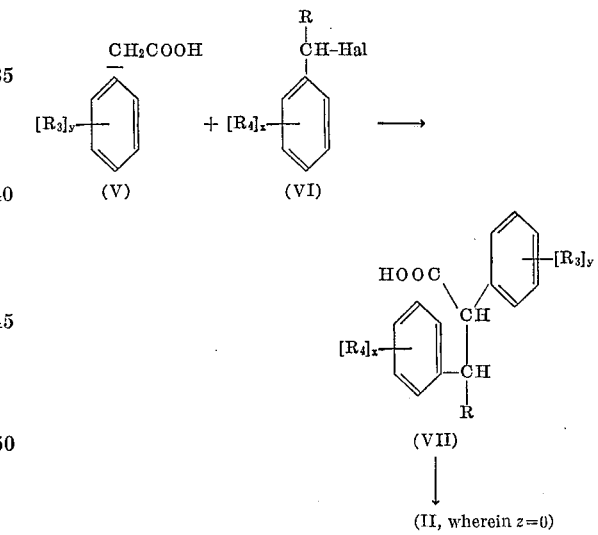

wherein R, $R_3$, $R_4$, $x$, and $y$ have the significance hereinbefore defined, and Hal represents chlorine or bromine. It is to be noted that the benzyl halide (VI) must be unsubstituted in at least one of the ortho positions in order that the compound (VII) can be cyclized as described below.

The reaction of the phenylacetic acids (V) with the benzyl halides (VI) to give the corresponding α-phenylhydrocinnamic acids (VII) can be effected, for example, using the procedure described by Hauser and Chambers, J. Am. Chem. Soc., 78, 4942, 1956, for the preparation of α-phenylhydrocinnamic acid from phenylacetic acid and benzyl chloride. The α-phenylhydrocinnamic acids (VII) [R=H] can also be prepared by Perkin condensation of a phenylacetic acid (V) with the appropriately substituted benzaldehyde followed by reduction of the intermediate α-phenylcinnamic acid so obtained. The procedure employed in this alternate synthesis is preferably that described by Solmssen, J. Am. Chem. Soc., 65, 2370, 1943.

The α-phenylhydrocinnamic acids (VII) so obtained are then cyclized to the required indanones (II wherein z=0) in the presence of a Lewis acid, using the general procedure described by Fieser and Hershberg, J. Am. Chem. Soc., 61, 1272, 1939. The term "Lewis acid" is well known in the art and is defined succinctly by Fieser and Fieser, "Organic Chemistry," 3rd edition, p. 138 (Reinhold, 1956). Examples of such compounds are hydrogen fluoride, boron trifluoride, arsenic trifluoride, phosphorus pentafluoride, titanium tetrafluoride, concentrated sulfuric acid, polyphosphoric acid, and the like. The preferred Lewis acid for use in the above process is hydrogen fluoride.

A particularly convenient method of cyclizing the α-phenylhydrocinnamic acids (VII) according to the above procedure comprises adding the acid (VII) to liquid hydrogen fluoride with stirring and then allowing the hydrogen fluoride to evaporate at room temperature. The desired indanone (II wherein z=0) is then isolated from the residue by conventional methods, for example, by dissolving the residue in a suitable solvent such as ether, washing the solution so obtained with an aqueous solution of a base such as sodium carbonate, sodium hydroxide, and the like, and then evaporating the washed solution to dryness. The indanone (II wherein z=0) so obtained can be purified, if desired, by conventional procedures, for example, by distillation.

The indanones of formula (II wherein z=0) wherein $R_3$ or $R_4$ represents hydroxy can be prepared conveniently by dealkylation of the corresponding compounds of formula (II wherein z=0) in which $R_3$ or $R_4$ represents alkoxy. The dealkylation can be effected using conventional methods, for example, by heating with aluminum chloride or bromide in the presence of an inert solvent such as benzene, xylene, and the like.

The indanones of formula (II wherein z=0) wherein $R_3$ or $R_4$ represents alkenyloxy can be prepared conveniently by alkenylation of the corresponding compounds wherein $R_3$ or $R_4$ represents hydroxy. The alkenylation can be effected using conventional procedures, for example, by reacting the free hydroxy compound with the appropriate alkenyl halide in the presence of a base such as potassium carbonate, sodium methoxide, and the like.

The benzyl halides (VI) [R=H], which are employed as starting materials in the above-described, and many of which are known in the art, can themselves be prepared from the correspondingly substituted benzoic acids, for example, by reduction of said acids or simple alkyl esters thereof, for example, with lithium aluminum hydride according to the procedure described by Nystrom and Brown, J. Am. Chem. Soc., 69, 2548, 1947. The benzyl alcohols so obtained are then converted to the corresponding benzyl halides (VI) using procedures known in the art, for example, that described by Gilman and Kirby, J. Am. Chem. Soc., 51, 475, 1929.

The benzyl halides (VI) [R=alkyl] can be prepared by reduction of the appropriate alkanophenone

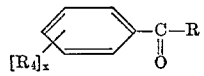

wherein R is alkyl, and $R_4$ and $x$ have the significance hereinbefore defined, using, for example, sodium in alcohol, followed by halogenation of the phenylalkylcarbinol so obtained, using, for example, a hydrogen halide as described by Kharasch and Kleiman, J. Am. Chem. Soc., 65, 11, 1943, or using, for example, a phosphorus oxyhalide as described by Gerrard, J. Chem. Soc., 1945, 106.

The phenylacetic acids (V), which are employed as starting materials in the above-described preparation, and many of which are known in the art (see, for example, Corse et al., J. Am. Chem. Soc., 70, 2837, 1948) can themselves be prepared from the corresponding benzyl halides (VI) [R=H] by procedures well known in the art.

For example, the benzyl halides (VI) can be reacted with an alkali metal cyanide, such as sodium cyanide, to form the corresponding benzyl cyanide which latter is then hydrolyzed, for example, using an aqueous mineral acid or aqueous alkali, to yield the desired phenylacetic acid (V). A suitable procedure for carrying out the conversion of the benzyl halide (VI) [R=H] to the phenylacetic acid (V) is that described by Silverman and Bogert, J. Org. Chem., 11, 34, 1946.

The α-tetralones (II wherein z=1) which are employed as starting materials in the process of the invention can be prepared by the following methods.

The α-tetralones (II wherein z=1), except those wherein $R_3$ and $R_4$ represent hydroxy or alkenyloxy, and except those wherein $R_6$ represents alkyl, can be prepared according to the following reaction scheme:

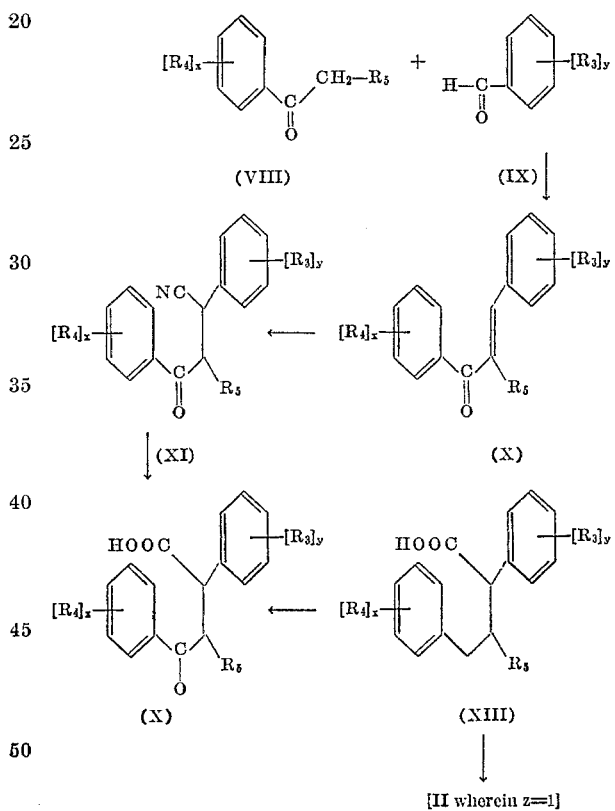

In the above reaction sequence, $R_3$, $R_4$, $R_5$, and $x$ and $y$ have the significance hereinbefore described with the exceptions noted above.

In the above reaction sequence, the appropriately substituted alkyl phenyl ketone (VIII) is condensed with the appropriately substituted benzaldehyde (IX) to produce the corresponding chalcone (X) under conditions conventionally employed in the preparation of chalcones, for example, by condensation of (VIII) and (IX) in the presence of a base such as sodium hydroxide, potassium hydroxide, and the like, in an inert solvent such as a mixture of water and a lower alkanol, for example, methanol, ethanol, and the like. The reaction is generally conducted at or below room temperature with external cooling as required. The chalcone (X) is isolated from the reaction mixture and purified by conventional procedures, for example, by solvent extraction followed by distillation, in the case of a liquid product, or recrystallization in the case of a solid product.

The chalcone (X) so obtained is then converted to the corresponding nitrile (XI) by reaction with hydrogen cyanide, for example, by treatment with an alkali metal cyanide such as potassium cyanide, sodium cyanide, and the like in the presence of acetic acid and an inert solvent such as aqueous methanol, aqueous ethanol and the like, using the procedure described by Newman, J. Am. Chem. Soc., 60, 2947, 1938 for the conversion of benzalacetophenone (chalcone) to α - phenyl - β - benzoylpropionitrile. The desired nitrile (XI) generally separates from the reaction mixture as a solid and can be isolated by filtration and purified by recrystallization.

The nitrile (XI) so obtained is hydrolyzed to the corresponding keto acid (XII) by conventional procedures for the hydrolysis of nitriles, for example, by heating under reflux in the presence of aqueous mineral acid such as sulfuric acid until hydrolysis is substantially complete. The desired acid (XII) generally separates from the reaction mixture as a solid and is isolated by filtration and purified by recrystallization or by other conventional procedures, for example, by conversion to an alkali metal salt followed by acidification of the latter to regenerate the free acid.

The keto acid (XII) so obtained is then subjected to reduction to form the corresponding acid (XIII). The reduction can be effected using any of the methods customarily employed for the conversion of a keto group to a methylene group. A particularly suitable reducing agent is amalgamated zinc and treatment of the keto acid (XII) with amalgamated zinc in the presence of a mineral acid affords the desired acid (XIII) in excellent yield. The acid (XIII) can be isolated from the reaction mixture by conventional procedures, for example, by decantation of the liquid reaction mixture, followed by solvent extraction of the decanted liquid and evaporation of the solvent. Generally speaking, the acid (XIII) so obtained is sufficiently pure to be used in the next step of the synthesis without further treatment. If desired, however, the acid (XIII) so obtained can be purified by conventional procedures, for example, by distillation in the case of a liquid or recrystallization in the case of a solid or by conversion to an alkali metal salt followed by acidification of the latter to yield the free acid.

In the final stage of the synthesis the acid (XIII) is cyclized to the required α-tetralone (II wherein $z=1$) in the presence of a Lewis acid, using the general procedure described by Fieser and Hershberg, J. Am. Chem. Soc., 61, 1272, 1939. The term "Lewis acid" is well known in the art and is defined succinctly by Fieser and Fieser, "Organic Chemistry," 3rd edition, p. 138 (Reinhold, 1956). Examples of such compounds are hydrogen fluoride, boron trifluoride, arsenic trifluoride, phosphorus pentafluoride, titanium tetrafluoride, concentrated sulfuric acid, polyphosphoric acid, and the like. The preferred Lewis acid for use in the above process is hydrogen fluoride.

A particularly convenient method of cyclizing the acid (XIII) according to the above procedure comprises adding the acid (XIII) to liquid hydrogen fluoride with stirring and then allowing the hydrogen fluoride to evaporate at about 20–30° C. The desired α-tetralone (II wherein $z=1$) is then isolated from the residue by conventional methods, for example, by dissolving the residue in a suitable solvent such as ether, washing the solution so obtained with an aqueous solution of a base such as sodium carbonate, sodium hydroxide, and the like, and then evaporating the washed solution to dryness. The α-tetralone (II wherein $z=1$) so obtained can be purified, if desired, by conventional procedures, for example, by recrystallization.

Alternatively, the acid (XIII) can be cyclised to the α-tetralone (II wherein $z=1$) by conversion of the acid (XIII) to the corresponding acid chloride and treatment of the latter with aluminum chloride or stannic chloride according to the procedure described by Fieser et al., J. Am. Chem. Soc., 60, 170, 1938.

The α-tetralones (II wherein $z=1$) wherein $R_3$ or $R_4$ represents hydroxy can be prepared conveniently by dealkylation of the corresponding compounds of formula (II wherein $z=1$) wherein $R_3$ or $R_4$ represents alkoxy. The dealkylation can be effected using conventional methods, for example, by heating with aluminum chloride or bromide in the presence of an inert solvent such as benzene, xylene, and the like.

The α-tetralones of formula (II wherein $z=1$) wherein $R_3$ or $R_4$ represents alkenyloxy can be prepared conveniently by alkenylation of the corresponding compounds wherein $R_3$ or $R_4$ represents hydroxy. The alkenylation can be effected using conventional procedures, for example, by reacting the free hydroxy compound with the appropriate alkenyl halide in the presence of a base such as potassium carbonate, sodium methoxide, and the like.

The α-tetralones of formula (II wherein $z=1$) wherein $R_6$ represents alkyl can be prepared by a modification of the synthesis described above. Thus the keto acid (XII) is alkylated with an appropriate alkylating agent, for example, the appropriate alkylmagnesium halide $R_6MgHal$ wherein $R_6$ is a lower-alkyl radical and Hal represents a halogen, preferably bromine or chlorine, to produce the corresponding carbinol having the formula:

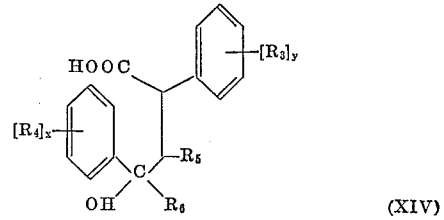

(XIV)

wherein $R_3$, $R_4$, $R_5$, $x$ and $y$ have the significance hereinbefore defined, and $R_6$ represents alkyl.

The reaction of the keto acid (XII) with the alkylmagnesium halide is carried out under conditions normally employed in Grignard reactions, preferably employing an excess of the Grignard reagent. The reaction mixture is decomposed by conventional procedures, for example, by treatment with water, ammonium chloride, dilute acid or the like. The desired product (XIV) is isolated by solvent extraction or other conventional procedures and purified by recrystallization in the case of a solid or distillation in the case of a liquid.

Alternatively, the alkylation of the keto acid (XII) to the carbinol (XIV) is effected by treatment of (XII) with the appropriate alkyl lithium compound in the presence of an inert solvent such as ether, benzene, toluene, and the like. The lithium compound is advantageously employed in excess of the stoichiometric proportion and is preferably employed in an amount of at least 1.5 moles per mole of compound (XII). The reaction is advantageously conducted at elevated temperatures, suitably at the boiling point of the solvent employed. The desired compound (XIV) can be isolated from the reaction mixture, for example, by decompising the latter with water followed by solvent extraction and removal of solvent. The compound (XIV) so obtained can be purified as described above.

The carbinol (XIV) so obtained is then dehydrated by treatment with a dehydrating agent such as zinc chloride, or in many cases by heat alone, to form the corresponding olefinic acid having the formula:

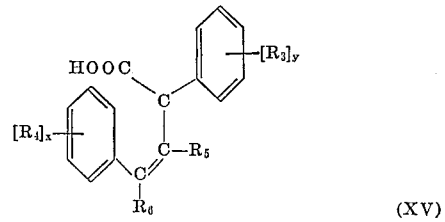

(XV)

followed by catalytic hydrogenation of the latter compound in the presence of a hydrogenation catalyst such as platinum oxide, palladium-on-charcoal and the like, to yield the desired saturated acid having the formula:

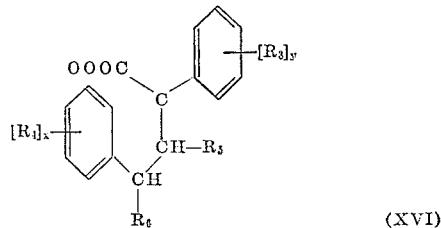

(XVI)

wherein $R_3$, $R_4$, $R_5$, $x$ and $y$ in Formulas XV and XVI have the significance hereinbefore defined, and $R_6$ represents alkyl.

The saturated acid (XVI) is then cyclized to the corresponding α-tetralone (II wherein $z=1$) using the procedure described above for the cyclization of the acid (XIII).

The alkyl phenyl ketones (VIII) which are employed as starting materials in the above-described synthesis of the α-tetralones (II wherein $z=1$) can be prepared from the corresponding nuclear-substituted benzoic acids by conversion of the latter to the acid chlorides followed by reaction of the latter with the appropriate dialkyl cadmium according to the procedure described in Chemical Reviews, 40, 15, 1947. Many of the alkyl phenyl ketones (VIII) are known in the literature.

The aldehydes (IX) which are employed as starting materials in the above-described synthesis of the α-tetralones (II wherein $z=1$) can be obtained by reduction of the corresponding substituted benzoyl chlorides using lithium tri-t-butoxyaluminum hydride using the procedure described by Brown et al., J. Am. Chem. Soc., 80, 5377, 1958. Many of the benzaldehydes of the Formula IX are known in the literature.

An alternative method for the preparation of the α-tetralones of formula (II wherein $z=1$) wherein $R_6$ represents hydrogen is that described by Newman, J. Am Chem. Soc., 62, 2295, 1940, for the preparation of 2-o-tolyl-3-methyl-α-tetralone. The method comprises reacting the appropriately substituted benzyl cyanide

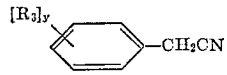

with the appropriately substituted phenethyl bromide

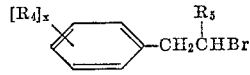

($R_3$, $R_4$, $R_5$, $x$ and $y$ having the significance hereinbefore defined) in the presence of sodamide and hydrolyzing the resulting nitrile to give the corresponding acid (XIII) which is then cyclized as hereinbefore described to the α-tetralone (II wherein $z=1$).

The acid addition salts having the Formula I can be prepared by methods well known in the art. For example, the acid addition salts can be prepared by reacting a free base having the Formula I with a pharmacologically acceptable acid, as hereinbefore defined, in the presence of an inert solvent such as methanol, ethanol, and the like.

The N-oxide compounds can be prepared by methods well known in the art, for example, by reacting the free base of the Formula I with an oxidizing agent such as hydrogen peroxide, peracetic acid, Caro's acid, and the like. Advantageously, the reaction is carried out at ordinary temperatures (e.g., of the order of 20 to 30° C.) in the presence of an inert solvent such as benzene, chloroform, lower-alkyl alkanoates such as ethyl acetate, and lower alkanols such as methanol, ethanol, isopropyl alcohol, and the like. Suitably the oxidizing agent is employed in at least stoichiometric proportion with respect to the free base I and preferably the oxidizing agent is present in a slight excess. When the reaction has been completed, any excess of oxidizing agent can be removed by treating the reaction mixture with an agent such as platinum oxide, palladium, Raney nickel, and inorganic hydrosulfites, such as sodium hydrosulfite, and the like.

The N-oxide acid addition salts can be prepared from the corresponding N-oxide and a pharmacologically acceptable acid using the procedures hereinbefore described for the preparation of the acid addition salts of the compounds I.

The quaternary ammonium salts can be prepared by reacting a free base of the Formula I with a quaternating agent, for example, an alkyl halide such as methyl iodide, ethyl chloride, isopropyl bromide, and the like, an alkenyl halide such as allyl chloride, allyl bromide, and the like, a dialkyl sulfate such as dimethyl sulfate, diethyl sulfate, and the like, an aralkyl halide such as benzhydryl chloride, phenethyl bromide, and the like, or an alkyl arylsulfonate such as methyl p-toluenesulfonate, and the like. Preferably the reaction is effected by heating the reactants together in the presence of an inert solvent such as acetonitrile, acetone, methanol, ethanol, and the like. Generally speaking, the desired quaternary salt separates from solution upon cooling the reaction mixture and can be isolated by filtration. Purification of the quaternary salt can be effected by conventional methods, for example, by recrystallization.

An essential element of the composition of the present invention is an edible food carrier. Suitable carriers include grains of all kinds, French fried potatoes, and bread. Sparrows will eat almost anything possessing food value. Pigeons and sea gulls prefer grain (e.g. bread). Starlings prefer French fried potatoes. Redwing blackbirds will eat rice, milo, and sorghum seeds. Chicken pellets also provide a suitable carrier or bait for many birds.

The concentration of the active ingredient in the composition can vary from 0.1 to 10% on a weight/weight basis. The concentration can be varied depending upon the potency of the specific active ingredient used and the food consumption of the species of bird to be controlled. Thus, the concentration should be sufficient to provide an effective amount when the composition is consumed by the bird. The upper limit is governed primarily by economy and the possibility of unpalatibility. Among the variables that must be considered in determining how much of the composition is placed in a particular area are the species of bird or rodent to be controlled, the time of the year, climatic conditions, the availability of other food, the type of composition, and the manner in which the composition is set out. In controlled conditions a dose of from about 5 to about 250 mg./kg. has proved effective.

In preparing the composition, the active ingredient is preferably dissolved in water-alcohol mixtures and sprayed on the bait or food carrier by tumbling. Suitable alcohols are isopropanol, methanol, ethanol and n-propanol. The alcohol content in water can vary from 10 to 40%.

The following preparations and examples illustrate the best mode contemplated by the inventor for carrying out this invention.

PREPARATION p-(2-diethylaminoethoxy) bromobenzene

A mixture of 272 g. (1.57 moles) of p-bromophenol, 1500 ml. of ethanol, and 340 g. (equivalent to 1.57 moles of sodium methoxide) of a 25% solution of sodium methoxide) of a 25% solution of sodium methoxide in methanol was stirred and heated under reflux and to the refluxing solution was added dropwise, with stirring, over a period of 30 minutes, a solution of 213 g. of 3-diethylaminoethyl chloride in 200 ml. of ethanol. After the addition was complete the mixture was stirred and heated under reflux for a further 3 hours. At the end of this time the reaction mixture was cooled and filtered, and the filtrate was evaporated under reduced pressure. The residual oil was dissolved in 1500 ml. of ether and the ether solution was washed with two 200-ml. portions of dilute aqueous sodium hydroxide solution and then with four 200-ml. portions of water. The ethereal solution was dried over anhydrous magnesium sulfate, filtered, and the filtrate evaporated. The residue was distilled under reduced pressure and that fraction having a boiling point of 110 to 115° C. at a pressure of 0.3 mm. of mercury was collected. There was thus obtained 310 g. of p-(2-diethylaminoethoxy) bromobenzene in the form of an oil. The free base so obtained was converted to the hydrochloride having a melting point of 139 to 140° C.

*Analysis.*—Calcd. for $C_{12}H_{19}BrClNO$: C, 46.69; H, 6.20; N, 4.54. Found: C, 47.04; H, 6.47; N, 4.49.

Using the above procedure, but replacing 2-diethylaminoethyl chloride by 3-dimethylaminopropyl chloride,
2-diethylaminopropyl chloride,
2-dibutylaminoethyl bromide,
2-methylethylaminoethyl bromide,
3-diethylaminobutyl chloride,
5-dimethylaminopentyl bromide,
2-diethylaminopentyl bromide,
6-dimethylaminohexyl chloride,
2-pyrrolidinoethyl chloride,
3-(2,2-dimethylpyrrolidino)propyl bromide,
2-piperidinoethyl chloride,
2-piperidinopropyl bromide,
2-morpholinoethyl chloride,
2-morpholinobutyl bromide,
1-methyl-4-(2'-chlorethyl)piperazine,
2-hexamethyleneiminoethyl chloride,
2-homopiperazinoethyl chloride, and
2-homomorpholinoethyl chloride, there are obtained p-(3-dimethylaminopropoxy)bromobenzene,
p-(2-diethylaminopropoxy)bromobenzene,
p-(2-dibutylaminoethoxy)bromobenzene,
p-(2-N-methyl-N-ethylaminoethoxy)bromobenzene,
p-(3-diethylaminobutoxy)bromobenzene,
p-(5-dimethylaminopentoxy)bromobenzene,
p-(2-diethylaminopentoxy)bromobenzene,
p-(6-dimethylaminohexyloxy)bromobenzene,
p-(2-pyrroldinoethoxy)bromobenzene,
p-[3-(2,2-dimethylpyrrolidino)propoxy]bromobenzene,
p-(2-piperidinoethoxy)bromobenzene,
p-(2-piperidinopropoxy)bromobenzene,
p-(2-morpholinoethoxy)bromobenzene,
p-(2-morpholinobutoxy)bromobenzene,
p-[2-(1'-methyl-4'-piperazino)ethoxy]bromobenzene,
p-(2-hexamethyleneiminoethoxy)bromobenzene,
p-(2-homopiperazinoethoxy)bromobenzene, and
p-(2-homomorpholinoethoxy)bromobenzene, respectively.

Using the above procedure, but replacing p-bromophenol by o-bromophenol and m-bromophenol, the corresponding o- and m-(tertiaryaminoalkoxy)bromobenzenes are obtained.

Examples 1 through 43 below illustrate the preparation of representative 2-phenyl-3-[p-(tertiaryaminoalkoxy)phenyl]indene free bases and acid addition salts, quaternary ammonium salts, N-oxides, and N-oxide acid addition salts thereof. The corresponding 2-phenyl-3-[o- and m-(tertiaryaminoalkoxy)phenyl]indene free bases and acid addition salts, quaternary ammonium salts, N-oxides, and N-oxide acid addition salts thereof are prepared as follows. The o- and m-(tertiaryaminoalkoxy)bromobenzenes obtained above are substituted for the corresponding p-(tertiaryaminoalkoxy)bromobenzenes in Examples 1 through 40, to obtain the corresponding 2-phenyl-3-[o- and m-(tertiaryaminoalkoxy)phenyl]indene free bases and acid addition salts thereof. The acid addition salts thus obtained are substituted for the corresponding 2-phenyl-3-[p-(tertiaryaminoalkoxy)phenyl]indene acid addition salts in Examples 41 through 43, to obtain the corresponding 2-phenyl-3-[o- and m-(tertiaryaminoalkoxy)phenyl]indene quaternary ammonium salts, N-oxides, and N-oxide acid addition salts.

PREPARATION 2 p-(2-diethylaminoethoxy)bromobenzene

A mixture of 272 g. (1.57 moles) of p-bromophenol, 1500 ml. of ethanol, and 340 g. (equivalent to 1.57 moles of sodium methoxide) of a 25% solution of sodium methoxide in methanol was stirred and heated under reflux and to the refluxing solution was added dropwise, over a period of 30 minutes a solution of 213 g. of 3-diethylaminoethyl chloride in 200 ml. of ethanol. After the addition was complete the mixture was stirred and heated under reflux for a further 3 hours. At the end of this time the reaction mixture was cooled and filtered, and the filtrate was evaporated under reduced pressure. The residual oil was dissolved in 1500 ml. of ether and the ether solution was washed with two 200-ml. portions of dilute aqueous sodium hydroxide solution and then with four 200-ml. portions of water. The ethereal solution was dried over anhydrous magnesium sulfate, and the filtrate was evaporated. The residue was distilled under reduced pressure and that fraction having a boiling point of 110 to 115° C. at a pressure of 0.3 mm. of mercury was collected. There was thus obtained 310 g. of p-(2-diethylaminoethoxy)bromobenzene in the form of an oil. The free base so obtained was converted to the hydrochloride having a melting point of 139 to 140° C.

*Analysis.*—Calcd. for $C_{12}H_{19}BrClNo$: C, 46.69; H, 6.20; N, 4.54. Found: C, 47.04; H, 6.47; N, 4.49.

Using the above procedure, but replacing the 2-diethylaminoethyl chloride by 3-dimethylaminopropyl chloride,
2-diethylaminopropyl chloride,
2-dibutylaminoethyl bromide,
2-methylethylaminoethyl bromide,
3-diethylaminobutyl chloride,
5-dimethylaminopentyl bromide,
2-diethylaminopentyl bromide,
6-dimethylaminohexyl chloride,
2-pyrrolidinoethyl chloride,
3-(2,2-dimethylpyrrolidino)propyl bromide,
2-piperidinoethyl chloride,
2-piperidinopropyl bromide,
2-morpholinoethyl chloride,
2-morpholinobutyl bromide,
1-methyl-4-(2-chloroethyl)piperazine,
2-hexamethyleneiminoethyl chloride,
2-homopiperazinoethyl chloride, and
2-homomorpholinoethyl chloride, there are obtained p-(3-dimethylaminopropoxy)bromobenzene,
p-(2-diethylaminopropoxy)bromobenzene,
p-(2-dibutylaminoethoxy)bromobenzene,
p-(2-N-methyl-N-ethylaminoethoxy)bromobenzene,
p-(3-diethylaminobutoxy)bromobenzene,
p-(5-dimethylaminopentoxy)bromobenzene,
p-(2-diethylaminopentoxy)bromobenzene,
p-(6-dimethylaminohexyloxy)bromobenzene,
p-(2-pyrrolidinoethoxy)bromobenzene,
p-[3-(2,2-dimethylpyrrolidino)propoxy]bromobenzene,
p-(2-piperidinoethoxy)bromobenzene,
p-(2-piperidinopropoxy)bromobenzene,
p-(2-morpholinoethoxy)bromobenzene,
p-(2-morpholinobutoxy)bromobenzene,
p-[2-(1'-methyl-4'-piperazino)ethoxy]bromobenzene,
p-(2-hexamethyleneiminoethoxy)bromobenzene,
p-(2-homopiperazinoethoxy)bromobenzene, and
p-(2-homomorpholinoethoxy)bromobenzene, respectively.

Using the above procedure, but replacing p-bromophenol by o-bromophenol and m-bromophenol, the corresponding o- and m-(tertiaryaminoalkoxy)bromobenzenes are obtained.

PREPARATION 3

3'-methoxychalcone

A solution of 45 g. of m-methoxyacetophenone in 75 ml. of 95% ethanol was added to a cooled solution of 16 g. of sodium hydroxide in 140 ml. of water. The mixture was then placed in an ice bath and 31.8 g. of benzaldehyde was added at such a rate as to keep the temperature below 20° C. The mixture was stirred for an additional 30 minutes in the cold and was then stirred for 27 hours at room temperature. The resulting solution was extracted with ether and the extract was washed with saturated brine solution before being percolated through anhydrous magnesium sulfate and evaporated to dryness under reduced pressure. The residue was distilled under reduced pressure. There was thus obtained 50.9 g. of 3'-methoxychalcone in the form of an oil having a boiling point of 180 to 185° C. at a pressure of 4 mm. of mercury.

Using the above procedure, but replacing m-methoxyacetophenone by the following known compounds:

4'-amylacetopheone,
3'-bromoacetophenone,
4'-chloroacetophenone,
4'-chloro-3'-ethylacetophenone,
5'-chloro-2'-methoxyacetophenone,
4'-ethylacetophenone,
2'-fluoroacetophenone,
3'-allyl-4'-methoxyacetophenone,
4'-methylmercaptoacetophenone,
4'-phenylmercaptoacetophenone,
4'-phenoxyacetophenone,
3'-trifluoromethylacetophenone, propiophenone, butyrophenone, and valerophenone,
there are obtained 4'-amylchalcone,
3'-bromochalcone,
4'-chlorochalcone,
4'-chloro-3'-ethylchalcone,
5'-chloro-2'-methoxychalcone,
4'-ethylchalcone, 2'-fluorochalcone,
3'-allyl-4'-methoxychalcone,
4'-methylmercaptochalcone,
4'-phenylmercaptochalcone,
4'-phenoxychalcone,
3'-trifluoromethylchalcone,
α-methylchalcone,
α-ethylchalcone, and
α-propylchalcone, respectively.

Similarly, using the procedure described in Preparation 2, but replacing benzaldehyde by the following known compounds:

2-bromobenzaldehyde,
5-bromo-2-methoxybenzaldehyde,
3-chlorobenzaldehyde,
2-chloro-6-fluorobenzaldehyde,
3,5-dibromo-2-ethoxybenzaldehyde,
2,3-dischlorobenzaldehyde,
p-tolualdehyde,
2,6-dimethylbenzaldehyde,,
4-methoxybenzaldehyde,
3,4-diethoxybenzaldehyde,
4-tert.-amloxybenzaldehyde,
4-hexyloxybenzaldehyde,
4-methylmercaptobenzaldehyde,
4-phenylmercaptobenzaldehyde,
4-phenoxybenzaldehyde,
4-allylbenzaldehyde, and
4-trifluoromethylbenzaldehyde,
there are obtained 2-bromochalcone, 5-bromo-2-methoxychalcone,
3-chlorochalcone,
2-chloro-6-fluorochalcone,
3,5-dibromo-2-ethoxychalcone,
2,3-dichlorochalcone,
4-methylchalcone,
2,6-dimethylchalcone,
4-methoxychalcone,
3,4-diethoxychalcone,
4-tert.-amyloxychalcone,
4-hexyloxychalcone,
4-methylmercaptochalcone,
4-phenylmercaptochalcone,
4-phenoxychalcone,
4-allylchalcone, and
4-trifluoromethylchalcone, respectively.

PREPARATION 4

2-phenyl-4-(3-methoxyphenyl)-4-ketobutyronitrile

A solution of 27.8 g. of potassium cyanide in 50 ml. of water was added to a mixture of 50.9 g. of 3'-methoxychalcone, 13.0 g. of acetic acid, and 100 ml. of 95% ethanol over a period of 10 minutes. The temperature was maintained at 45° C. The turbid mixture was then stirred for 6 hours and allowed to stand overnight in the cold. The crystalline solid which had separated was isolated by filtration, washed with ice-cold aqueous ethanol and with water, and recrystallized from ethanol. There was thus obtained 49.22 g. of 2-phenyl-4-(3-methoxyphenyl)-4-ketobutyronitrile in the form of a crystalline solid having a melting point of 96 to 101° C. The infrared spectrum of the compound (mineral oil mull) exhibited maxima at 2200, 1660, and 1580 reciprocal centimeters.

Using the above procedure, but replacing 3'-methoxychalcone by

4'-amylchalcone,
3'-bromochalcone,
4'-chlorochalcone,
4'-chloro-3'-ethylchalcone,
5'-chloro-2'-methoxychalcone,
4'-ethylchalcone,
2'-fluorochalcone,
3'-allyl-4'-methoxychalcone,
4'-methylmercaptochalcone,
4'-phenylmercaptochalcone,
4'-phenoxychalcone,
3'-trifluoromethylchalcone,
α-methylchalcone,
α-ethylchalcone,
α-propylchalcone,
2-bromochalcone,
5-bromo-2-methoxychalcone,
3-chlorochalcone,
2-chloro-6-fluorochalcone,
3,5-dibromo-2-ethoxychalcone,
2,3-dichlorochalcone,
4-methylchalcone,
2,6-dimethylchalcone,
4-methoxychalcone,
3,4-diethoxychalcone,
4-tert.-amyloxychalcone,
4-hexyloxychalcone,
4-methylmercaptochalcone,
4-phenylmercaptochalcone,
4-phenoxychalcone,
4-allychalcone, and
4-trifluoromethylchalcone,
there are obtained 2-phenyl-4-(4-amylphenyl)-4-ketobutyronitrile,
2-phenyl-4-(3-bromophenyl)-4-ketobutyronitrile,
2-phenyl-4-(4-chlorophenyl)-4-ketobutyronitrile,
2-phenyl-4-(4-chloro-3-ethylphenyl)-4 - ketobutyronitrile, 2-phenyl-4-(5-chloro-2-methoxyphenyl)-4-ketobutyronitrile,
2-phenyl-4-(4-ethylphenyl)-4-ketobutyronitrile,
2-phenyl-4-(4-methylmercaptophenyl)-4-ketobutyronitrile,
2-phenyl-4-(3-allyl-4-methoxyphenyl)-4-ketobutyronitrile,
2-phenyl-4-(4-phenylmercaptophenyl)-4-ketobutyronitrile,
2-phenyl-4-(2-fluorophenyl)-4-ketobutyronitrile,
2-phenyl-4-(4-phenoxyphenyl)-4-ketobutyronitrile,
2-phenyl-4-(3-trifluoromethylphenyl)-4-ketobutyronitrile,
2,4-diphenyl-3-methyl-4-ketobutyronitrile,
2,4-diphenyl-3-ethyl-4-ketobutyronitrile,
2,4-diphenyl-3-propyl-4-ketobutyronitrile,
2-(2-bromophenyl)-4-phenyl-4-ketobutyronitrile,
2-(5-bromo-2-methoxyphenyl)-4-phenyl-4-ketobutyronitrile,
2-(3-chlorophenyl)-4-phenyl-4-ketobutyronitrile,
2-(2-chloro-6-fluorophenyl)-4-phenyl-4-ketobutyronitrile,
2-(3,5-dibromo-2-ethoxyphenyl)-4-phenyl-4-ketobutyronitrile,
2-(2,3-dichlorophenyl)-4-phenyl-4-ketobutyronitrile,
2-p-tolyl-4-phenyl-4-ketobutyronitrile,
2-(2,6-dimethylphenyl)-4-phenyl-4-ketobutyronitrile,
2-(4-methoxyphenyl)-4-phenyl-4-ketobutyronitrile,
2-(3,4-diethoxyphenyl)-4-phenyl-4-ketobutyronitrile,
2-(4-tert.-amyloxyphenyl)-4-phenyl-4-ketobutyronitrile,
2-(4-hexyloxyphenyl)-4-phenyl-4-ketobutyronitrile,
2-(4-methylmercaptophenyl)-4-phenyl-4-ketobutyronitrile,
2-(4-phenylmercapto)-4-phenyl-4-ketobutyronitrile,
2-(4-phenoxyphenyl)-4-phenyl-4-ketobutyronitrile,
2-(4-allylphenyl)-4-phenyl-4-ketobutyronitrile, and
2-(4-trifluoromethylphenyl)-4-phenyl-4-ketobutyronitrile, respectively.

PREPARATION 5

2-phenyl-4-(3-methoxyphenyl)-4-ketobutyric acid

A suspension of 49.22 g. of 2-phenyl-4-(3-methoxyphenyl)-4-ketobutyronitrile in a mixture of 140 ml. of concentrated sulfuric acid and 125 ml. of water was heated on a steam bath with vigorous stirring for 4 hours. The resulting mixture was cooled and diluted with ice-water. The solid which separated was isolated by filtration and recrystallized from aqueous ethanol and then from benzene. There was thus obtained 29.5 g. of 2-phenyl-4-(3-methoxyphenyl)-4-ketobutyric acid in the form of a crystalline solid having a melting point of 140 to 145° C. An analytical sample having a melting point of 143 to 145° C. was obtained by recrystallization from benzene.

Analysis.—Calcd. for $C_{17}H_{16}O_4$: C, 71.82; H, 5.67. Found: C, 72.10; H, 5.74.

Using the above procedure, but replacing 2-phenyl-4-(3-methoxyphenyl)-4-ketobutyronitrile by the appropriately substituted 2,4-diphenyl-4-ketobutyronitrile (prepared as described in Preparation 3), there are obtained 2-phenyl-4-(4-amylphenyl)-4-ketobutyric acid,
2-phenyl-4-(3-bromophenyl)-4-ketobutyric acid,
2-phenyl-4-(4-chlorophenyl)-4-ketobutyric acid,
2-phenyl-4-(4-chloro-3-ethylphenyl)-4-ketobutyric acid,
2-phenyl-4-(5-chloro-2-methoxyphenyl)-4-ketobutyric acid,
2-phenyl-4-(4-ethylphenyl)-4-ketobutyric acid,
2-phenyl-4-(2-fluorophenyl)-4-ketobutyric acid,
2-phenyl-4-(3-allyl-4-methoxyphenyl)-4-ketobutyric acid,
2-phenyl-4-(4-methylmercaptophenyl)-4-ketobutyric acid,
2-phenyl-4-(4-phenylmercaptophenyl)-4-ketobutyric acid,
2-phenyl-4-(4-phenoxyphenyl)-4-ketobutyric acid,
2-phenyl-4-(3-trifluoromethylphenyl)-4-ketobutyric acid,
2,4-diphenyl-3-methyl-4-ketobutyric acid,
2,4-diphenyl-3-ethyl-4-ketobutyric acid,
2,4-diphenyl-3-propyl-4-ketobutyric acid,
2-(2-bromophenyl)-4-phenyl-4-ketobutyric acid,
2-(5-bromo-2-methoxyphenyl)-4-phenyl-4-ketobutyric acid,
2-(3-chlorophenyl)-4-phenyl-4-ketobutyric acid,
2-(2-chloro-6-fluorophenyl)-4-phenyl-4-ketobutyric acid,
2-(3,5-dibromo-2-ethoxyphenyl)-4-phenyl-4-ketobutyric acid,
2-(2,3-dichlorophenyl)-4-phenyl-4-ketobutyric acid,
2-p-tolyl-4-phenyl-4-ketobutyric-acid,
2-(2,6-dimethylphenyl)-4-phenyl-4-ketobutyric acid,
2-(4-methoxyphenyl)-4-phenyl-4-ketobutyric acid,
2-(3,4-diethoxyphenyl)-4-phenyl-4-ketobutyric acid,
2-(4-tert.-amyloxyphenyl)-4-phenyl-4-ketobutyric acid,
2-(4-hexyloxyphenyl)-4-phenyl-4-ketobutyric acid,
2-(4-methylmercaptophenyl)-4-phenyl-4-ketobutyric acid,
2-(4-phenylmercapto)-4-phenyl-4-ketobutyric acid,
2-(4-phenoxyphenyl)-4-phenyl-4-ketobutyric acid,
2-(4-allylphenyl)-4-phenyl-4-ketobutyric acid, and
2-(4-trifluoromethylphenyl)-4-phenyl-4-ketobutyric acid, respectively.

PREPARATION 6

2-phenyl-4-(3-methoxyphenyl)butyric acid

A total of 300 g. of mossy zinc was washed briefly with 2.5 N hydrochloric acid and then with water. The metal was covered with a solution of 6.7 g. of mercuric chloride in 500 ml. of water, and this mixture was allowed to stand for 30 minutes with occasional shaking. The liquid phase was decanted and the amalgamated metal was washed well with water. To the amalgamated zinc so produced was added a mixture of 29.3 g. of 2-phenyl-4-(3-methoxyphenyl)-3-ketobutyric acid and 400 ml. of hydrochloric acid. The mixture was heated cautiously to reflux temperature and then heated under reflux for a total of 20 hours, additional portions of hydrochloric acid being added after 5 hours and 10 hours of heating. The resulting mixture was cooled and the liquid was decanted from the solid. The solid residue was washed well with ether and the decanted liquid was extracted with ether. The ether extract and washings were combined and washed with water and then with saturated brine solution before being percolated through anhydrous magnesium sulfate. The percolate was evaporated to dryness. There was thus obtained 26.2 g. of 2-phenyl-4-(3-methoxyphenyl)butyric acid in the form of a viscous oil which was employed without further purification in the process of Preparation 6. The infrared spectrum of the compound (mineral oil mull) exhibited a maximum at 1705 reciprocal centimeters.

Using the above procedure, but replacing the 2-phenyl-4-(3-methoxyphenyl)-4-ketobutyric acid by the appropriately substituted 2,4-diphenyl-4-ketobutyric acid (prepared as described in Preparation 4), there are obtained 2-phenyl-4-(4-amylphenyl)-,
2-phenyl-4-(3-bromophenyl)-,
2-phenyl-4-(4-chlorophenyl)-,
2-phenyl-4-(4-chloro-3-ethylphenyl)-,
2-phenyl-4-(5-chloro-2-methoxyphenyl)-,
2-phenyl-4-(4-ethylphenyl)-,
2-phenyl-4-(2-fluorophenyl)-,
2-phenyl-4-(3-allyl-4-methoxyphenyl)-,
2-phenyl-4-(4-methylmercaptophenyl)-,
2-phenyl-4-(4-phenylmercaptophenyl)-, 2-phenyl of 2-phenyl-6-methoxy-1,2,3,4-tetrahydro-1-naphthalenone in the form of a crystalline compound having a melting point of 113 to 116° C.

Analysis.—Calcd. for $C_{17}H_{16}O_2$: C, 80.92; H, 6.39. Found: C, 81.08; H, 6.35.

Using the procedure above, but replacing 2-phenyl-4-(3-methoxyphenyl)butyric acid by the appropriately substituted 2,4-diphenylbutyric acid (prepared as described in Preparation 5), there are obtained 2-phenyl-7-amyl-,
2-phenyl-6-bromo-,
2-phenyl-7-chloro-,
2-phenyl-7-chloro-6-ethyl-,
2-phenyl-8-chloro-5-methoxy-,
2-phenyl-7-ethyl-,
2-phenyl-5-fluoro-,
2-phenyl-6-allyl-7-methoxy-,
2-phenyl-7-methylmercapto-,
2-phenyl-7-phenylmercapto-,
2-phenyl-7-phenoxy-,
2-phenyl-6-trifluoromethyl-,
2-phenyl-3-methyl-,
2-phenyl-3-ethyl-,
2-phenyl-3-propyl-,
2-(2-bromophenyl)-,
2-(5-bromo-2-methoxyphenyl)-,
2-(3-chlorophenyl)-,
2-(2-chloro-6-fluorophenyl)-,
2-(3,5-dibromo-2-ethoxyphenyl)-,
2-(2,3-dichlorophenyl)-,
2-p-tolyl-,
2-(2,6-dimethylphenyl)-,
2-(4-methoxyphenyl)-,
2-(3,4-diethoxyphenyl)-,
2-(4-tert.-amyloxyphenyl)-,
2-(4-hexyloxyphenyl)-,
2-(4-methylmercaptophenyl)-,
2-(4-phenylmercaptophenyl)-,
2-(4-phenoxyphenyl)-,
2-(4-allylphenyl),- and
2-(4-trifluoromethylphenyl-1,2,3,4-tetrahydro-1-naphthalenone, respectively.

PREPARATION 7

2-phenyl-4-methyl-6-methoxy-1,2,3,4-tetrahydro-1-naphthalenone

A solution of 5 g. of 2-phenyl-4-(3-methoxyphenyl)-3-ketobutyric acid in 100 ml. of ether is cooled to 0° C., and treated dropwise with stirring with 29 ml. of 3 M ethereal methyl magnesium bromide solution. When the addition is complete the mixture is stirred for several hours at room temperature and then heated under reflux for 1 hour. The reaction mixture is decomposed by the addition of ice water and dilute hydrochloric acid solution. The ethereal layer is separated, washed with aqueous ammonium chloride solution and with water, and then dried over anhydrous sodium sulfate. The dried solution is filtered, and the filtrate is evaporated to dryness and the residue is recrystallized from aqueous ethanol. There is thus obtained 2 - phenyl - 4 - (3 - methoxyphenyl) - 4-hydroxyvaleric acid.

A mixture of 1 g. of 2-phenyl-4-(3-methoxyphenyl)-4-hydroxyvaleric acid, 100 mg. of p-toluenesulfonic acid and 100 ml. of benzene is heated under reflux with removal of evolved water until no further water is eliminated from the reaction mixture. The residual solution is extracted with an excess of aqueous sodium hydroxide solution and the latter is acidified with hydrochloric acid. The solid which separates is isolated by filtration, washed with water, and dried. The residue [2-phenyl - 4 - (3 - methoxyphenyl) - 3 - pentenoic acid] is dissolved in ethanol and hydrogenated in the presence of palladium-on-charcoal catalyst until the uptake of hydrogen is complete. The resulting solution is filtered and the filtrate is evaporated to dryness. There is thus obtained 2-phenyl-4-(3-methoxyphenyl)valeric acid. The latter acid is then cyclised using the procedure described in Preparation 7 to give 2-phenyl-4-methyl-6-methoxy-1,2,3,4-tertahydro-1-naphthalenone.

Examples 44 through 97 below illustrate the preparation of representative 2 - phenyl - 1-[p-tetriaryaminoalkoxy) phenyl]-3,4-dihydronaphthalene free bases and acid addition salts, quaternary ammonium salts, N-oxides, and N-oxide acid addition salts thereof. The corresponding 2-phenyl - [o- and m - (tertiaryaminoalkoxy)phenyl]-3,4-dihydronaphthalene free bases and acid addition salts, quaternary ammonium salts, N-oxides, and N-oxide acid addition salts thereof are prepared as follows. The appropriate o- and m-(tertiaryaminoalkoxy)bromobenzenes are substituted for the corresponding p-(tertiaryaminoalkoxy)bromobenzenes in Examples 44 through 95 to obtain the corresponding 2-phenyl-1-[o- and m-(tertiaryaminoalkoxy)phenyl] - 3,4 - dihydronaphthalene free bases and addition salts thereof. The acid addition salts thus obtained are substituted for the corresponding 2 - phenyl-1-[p-(tertiaryaminoalkoxy)phenyl]-3,4-dihydronaphthalene acid addition salts in Examples 96 and 97 to obtain the corresponding quaternary ammonium salts, N-oxides, and N-oxide acid addition salts.

EXAMPLE 1

2-phenyl-3-[p-(2-diethylaminoethoxy)phenyl]indene and acid addition salts thereof A solution of 4.16 g. (0.02 mole) of 2-phenyl-1-indanone (v. Miller and Rohde, Ber., 25, 2095, 1892) in 50 ml. of tetrahydrofuran was added to a solution of p-(2-diethylaminoethoxy)phenyl magnesium bromide prepared from 5.44 g. (0.02 mole) of p-(2-diethylaminoethoxy)bromobenzene and 0.66 g. of magnesium in 50 ml. of tetrahydrofuran. The resulting mixture was heated for 16 hrs. under reflux and allowed to cool. Water and ether were added to the cooled mixture and the resulting mixture was filtered through diatomaceous earth (Celite). The organic layer of the filtrate was separated, washed with water, and dried over anhydrous sodium sulfate. The dried solution was filtered and the filtrate was evaporated under reduced pressure. The residue was dissolved in ether and the solution was washed with 400 ml. of 0.5 N hydrochloric acid. The acid extract was extracted with 400 ml. of methylene chloride and the methylene chloride extract was evaporated to dryness. The residue was heated under reflux with a mixture of 100 ml. of benzene and 0.15 g. of p-toluenesulfonic acid for 2 hrs., the evolved water being collected in a water trap. The benzene solution was cooled and aqueous sodium bicarbonate solution and ether were added. The organic layer was separated and extracted with 0.5 N hydrochloric acid. The acid extract was extracted with methylene chloride and the methylene chloride extract was evaporated to dryness. The residual gum was dissolved in a small quantity of benzene and the benzene solution was washed with aqueous sodium bicarbonate solution before being chromatographed on a magnesium silicate (Florisil) column. The column was eluted with Skellysolve B (a mixture of hexanes) containing a small proportion of acetone and the eluate containing the desired amine was evaporated to dryness. There was thus obtained 2-phenyl-3 - [p - (2 - diethylaminoethoxy)phenyl]indine in the form of an oily gum. The latter gum was dissolved in ether and extracted with 90 ml. of aqueous 24% perchloric acid solution. The acid extract was extracted with methylene chloride and the methylene chloride extract was evaporated to dryness. The residual foam was triturated with ethyl acetate and the crystals which separated were isolated by filtration and recrystallized from ethyl acetate. There was thus obtained 2-phenyl-3-[p-(2-diethylaminoethoxy)phenyl]indene perchlorate in the form of a crystalline solid having a melting point of 156 to 157.5° C. The ultraviolet absorption spectrum of the compound (in solution in ethanol) exhibited maxima at 232, 248, 305, and 313 millimicrons.

*Analysis.*—Calcd. for $C_{27}H_{30}ClNO_5$: C, 67.00; H, 6.25; N, 2.89. Found: C, 67.05; H, 6.36; N, 3.10.

Another run was made in which the starting materials were 5.0 g. of 2-phenyl-1-indanone, 6.55 g. of p-(2-diethylaminoethoxy)bromobenzene, and 0.8 g. of magnesium. The procedure was the same as described above through the step of heating the benzene solution of the 2-phenyl-3-[p-(2-diethylaminoethoxy)phenyl]indene hydrochloride in the presence of p-toluenesulfonic acid. The benzene solution, after being washed with saturated aqueous sodium bicarbonate solution, was shaken with aqueous 10% hydriodic acid. Three phases separated, an aqueous phase, a benzene phase, and an oil. The oil was separated and extracted with methylene chloride and the extract was dried over anhydrous sodium sulfate. The dried solution was filtered and the filtrate was evaporated to dryness. The solid residue was recrystallized three times from methylene chloride-ethyl acetate mixture. There was thus obtained 4.29 g. of 2-phenyl-3-[p-(2-diethylaminoethoxy)phenyl]indene hydroiodide having a melting point of 175.5 to 177.5° C.

EXAMPLE 2

2-(p-methoxyphenyl)-3-[p-(2-diethylaminoethoxy)phenyl]indene and the hydrochloride thereof (A) 2-(p-methoxyphenyl)-1-indanone.—A solution of 39.0 g. (0.235 mole) of p-methoxyphenylacetic acid in 500 ml. of ether was added to a solution of potassium amide prepared from 20.4 g. (0.52 mole) of potassium in 750 ml. of liquid ammonia. To the resulting mixture was added slowly, with stirring, over a period of 10 minutes, a solution of 33.0 g. (0.26 mole) of benzyl chloride in 60 ml. of ether. The mixture was stirred for a further 30 minutes, at the end of which time an additional 3 ml. (0.003 mole) of benzyl chloride was added and the liquid ammonia was then allowed to evaporate. The residue was dissolved in water and the aqueous solution so obtained was extracted with ether and then filtered through diatomaceous earth (Celite). The filtrate was acidified by the addition of concentrated hydrochloric acid and the solid which separated was isolated by filtration and recrystallized from a mixture of chloroform and hexane. There was thus obtained 53.85 g. of α-benzyl-p-methoxyphenylacetic acid in the form of a crystalline solid having a melting point of 105 to 108° C.

The acid (53.85 g.) so obtained was added portionwise to 300 ml. of well stirred liquid hydrogen fluoride. The hydrogen fluoride was then allowed to evaporate at room temperature and the residue was dissolved in ether. The ethereal solution was washed successively with water, aqueous sodium bicarbonate solution, aqueous 0.5 N sodium hydroxide solution, and finally with brine. The washed ethereal solution was dried over anhydrous sodium sulfate, filtered, and the filtrate was evaporated to dryness. The residual oily solid was dissolved in benzene and chromatographed over a column of magnesium silicate (Florisil). The column was eluted with Skellysolve B containing 5% by volume of acetone. The major crystalline fraction was recrystallized from aqueous methanol. There was thus obtained 29.73 g. of 2-(p-methoxyphenyl)-1-indanone in the form of a crystalline solid having a melting point of 74 to 79° C. An analytical sample having a melting point of 79 to 81° C. was obtained by further recrystallization from aqueous methanol.

*Analysis.*—Calcd. for $C_{16}H_{14}O_2$: C, 80.64; H, 5.92. Found: C, 80.55; H, 5.99.

(B) 2 - (p - methoxyphenyl) - 3 - [p-(2-diethylaminoethoxy)phenyl]indene hydrochloride.—A solution of 4.88 g. (0.0205 mole) of 2-(p-methoxyphenyl)-1-indanone in 75 ml. of tetrahydrofuran was added with stirring to a Grignard reagent prepared from 5.60 g. (0.0205 mole) of p-(diethylaminoethoxy)bromobenzene and 0.51 g. of magnesium in 75 ml. of tetrahydrofuran. The resulting mixture was heated under reflux for 16 hr. before being cooled to room temperature. To the cooled solution was added ether and water. The organic layer was separated, washed with water and dried over anhydrous sodium sulfate. The dried solution was filtered and the filtrate was evaporated to dryness. The residue was dissolved in ether and the ether solution was extracted with 0.5 N hydrochloric acid. The acid extract was extracted with methylene chloride and the methylene chloride solution was evaporated to dryness. The residual foam (6.55 g.) was heated under reflux for 2 hr. with 150 ml. of benzene containing 0.25 g. of p-toluenesulfonic acid. The evolved water was collected in a water trap. The residue was cooled and ether and saturated aqueous sodium bicarbonate solution were added. The organic layer was separated and extracted with 0.5 N hydrochloric acid. The acid extract was extracted with methylene chloride and the methylene chloride solution was evaporated. The residue was recrystallized twice from a mixture of methylene chloride and ethyl acetate to yield 3.67 g. of 2-(p-methoxyphenyl)-3-[p-(2 - diethylaminoethoxy)phenyl]indene hydrochloride in the form of a crystalline solid having a melting point of 168 to 171° C. An analytical sample having a melting point of 170 to 172° C. was obtained by further recrystallization from the above solvent mixture. The ultraviolet absorption spectrum of the compound (in solution in ethanol) exhibited maxima at 236, 244, 310, and 320 millimicrons.

*Analysis.*—Calcd. for $C_{28}H_{32}ClNO_2$: C, 74.73; H, 7.17; N, 3.11. Found: C, 74.36; H, 7.32; N, 3.31.

EXAMPLE 3

2-(p-tolyl)-3-[p-(2-diethylaminoethoxy)phenyl]indene and the hydrobromide thereof (A) 2-(p-tolyl) - 1 - indanone.—A solution of 15.0 g. (0.10 mole) of p-tolylacetic acid in 50 ml. of ether was added to a solution of 0.20 mole of potassium amide (prepared from 7.82 g. of potassium) in 250 ml. of liquid ammonia. The mixture was stirred for 5 minutes and then a solution of 13.9 g. (0.11 mole) of benzyl chloride in 50 ml. of ether was added slowly with stirring. After the addition was complete the resulting mixture was stirred for a period of 30 minutes, at the end of which time a further 2 g. of benzyl chloride was added. The mixture was again stirred for a further 30 minutes before the liquid ammonia was allowed to evaporate. The residue was dissolved in 200 ml. of water and the aqueous solution was filtered through diatomaceous earth. The filtrate was acidified with concentrated hydrochloric acid and the solid which separated was isolated by filtration and recrystallized three times from hexane. There was thus obtained 12.6 g. of α-benzyl-p-tolylacetic acid in the form of a crystalline solid having a melting point of 104 to 107° C. The acid so obtained was dissolved portionwise in 100 ml. of liquid hydrogen fluoride and, when the addition was complete, the hydrogen fluoride was allowed to evaporate. The residue was dissolved in ether and the ethereal solution was washed successively with water, aqueous sodium bicarbonate solution, aqueous 0.5 N sodium hydroxide solution, and brine, and dried over anhydrous sodium sulfate. The dried solution was filtered and the filtrate was evaporated to dryness. The residual oil was distilled under reduced pressure and that fraction having a boiling point of 155 to 160° C. at a pressure of 1.5 to 2 mm. of mercury was collected. There was thus obtained 6.32 g. of 2-(p-tolyl)-1-indanone in the form of an oil.

*Analysis.*—Calcd. for $C_{16}H_{14}O$: C, 86.45; H, 6.35. Found: C, 86.52; H, 6.58.

(B) 2-(p-tolyl)-3-[p - diethylaminoethoxy)phenyl] indene and the hydrobromide thereof.—A solution of 6.32 g. (0.0285 mole) of 2-(p-tolyl)-1-indanone in 65 ml. of tetrahydrofuran was added slowly with stirring to a solution of 0.0285 mole of p-(2-diethylaminoethoxy)phenyl magnesium bromide in 80 ml. of tetrahydrofuran. The resulting mixture was heated under reflux for 16 hr. before being cooled to room temperature and treated with a small amount of water. The mixture so obtained was filtered and the filtrate was diluted with ether. The organic layer was separated and washed with water and then with brine before being dried over anhydrous sodium sulfate. The dried solution was filtered and the filtrate was evaporated to dryness. The residue was dissolved in ether and the ether solution was extracted with 0.5 N hydrochloric acid. The acid extract was extracted with five 50-ml. portions of methylene chloride and the combined methylene chloride extracts were evaporated to dryness. The residual foam was heated under reflux for 2 hr. with 200 ml. of benzene containing 0.2 g. of p-toluenesulfonic acid and the evolved water was collected in a water trap. The residual benzene solution was washed with aqueous sodium bicarbonate solution and then with brine before being evaporated to dryness. There was thus obtained 2-(p-tolyl)-3-[p-(2-diethylaminoethoxy)phenyl]indene as an oil. The oil was dissolved in ether and the ether solution was extracted with aqueous 10% hydrobromic acid. The acid extract was extracted with methylene chloride and the methylene chloride extract was dried over anhydrous sodium sulfate. The dried solution was filtred and the filtrate was evaporated to dryness. The residue was recrystallized twice from a mixture of methylene chloride and ethyl aceate. There was thus obtained 5.6 g. of 2-(p-tolyl)-3-[p-(2-diethylaminoethoxy)-phenyl]indene hydrobromide in the form of a crystalline solid having a melting point of 188 to 190° C.

*Analysis.*—Calcd. for $C_{28}H_{32}BrNO$: C, 70.28; H, 6.74; N, 2.93. Found: C, 75.12; H, 7.02; N, 2.95.

EXAMPLE 4

2-phenyl-3-[p-(2-diethylaminoethoxy)phenyl]-5-methoxyidene and the hydrochloride thereof Using the procedure desecribed in Example 2, part B, but replacing 2-(p-methoxyphenyl)-1-indanone by 2-phenyl-6-methoxy-1-indanone (Jocelyn, J. Chem. Soc., 1954, 1640), there was obtained 2-phenyl-3-[p-diethylaminoethoxy)phenyl]-5-methoxyindene and the hydrochloride thereof. The hydrochloride was recrystallized from ethyl aceate to give an ethyl acetate solvate of 2-phenyl-3-[p-(2-diethylaminoethoxy) - phenyl] - 5 - methoxy-indene hydrochloride in the form of a crystalline solid having a melting point of 104 to 110° C.

*Analysis.*—Calcd. for $C_{28}H_{32}ClNO_2 \cdot \frac{1}{4}CH_3CO_2C_2H_5$: C, 73.79; H, 7.26; N, 2.97. Found: C, 73.42; H, 6.62; N, 3.05.

The unsolvated hydrochloride was obtained by heating the solvated salt at 80° C. in vacuo for a prolonged period.

EXAMPLE 5

2-phenyl-3-[p-(2-diethylaminoethoxy)phenyl-6-methoxyindene and the hydrochloride thereof A solution of 5.40 g. (0.0237 mole) of 2-phenyl-5-methoxy-1-indanone (Jocelyn, supra) in 75 ml. of tetrahydrofuran was added slowly with stirring to the Grignard reagent prepared from 6.30 g. (0.023 mole) of p-(2-diethylaminoethoxy)-bromobenzene and 0.59 g. of magnesium in 65 ml. of tetrahydrofuran. The resulting mixture was heated under reflux for 16 hrs. before being cooled and treated with a small amount of water. The mixture so obtained was filtered and the filtrate was washed with water. The organic layer was separated and dried over anhydrous sodium sulfate. The dried solution was filtered and the filtrate was evaporated to dryness. The residue was dissolved in ether and the ether solution was extracted with 0.5 N hydrochloric acid. The aqueous layer formed a gel which was separated and extracted with 800 ml. of chloroform. The chloroform solution was dried over anhydrous sodium sulfate, filtered, and the filtrate evaporated to dryness. The residue was heated under reflux for 1.5 hr. with 200 ml. of benzene containing 0.2 g. of p-toluenesulfonic acid, the evolved water being collected in a water trap. The residual benzene solution containing 2-phenyl-3-[p-diethylaminoethoxy)phenyl]-6-methoxyindene salts was washed with aqueous sodium bicarbonate solution and then with brine and dried over anhydrous sodium sulfate. The dried solution was filtered and the filtrate was saturated with hydrogen chloride before being evaporated to dryness. The residue was recrystallized twice from a mixture of methylene chloride and ethyl aceate. There was thus obtained 4.24 g. of an ethyl acetate solvate of 2-phenyl-3-[p-(2-diethylaminoethoxy)phenyl]-6-methoxyindene hydrochloride in the form of a crystalline solid having a melting point of 174.5 to 177° C. An analytical sample having a melting point of 174 to 176° C. was obtained by further recrystallization from the same solvent mitxure. The ultraviolet absorption spectrum of the compound (in solution in ethanol) exhibited maxima at 224, 234, 251, 313, and 332 millimicrons.

*Analysis.*—Calcd. for $C_{28}H_{32}ClNO_2 \cdot \frac{1}{4}CH_3CO_2C_2H_5$: C, 73.79; H, 7.26; N, 2.97. Found: C, 74.18; H, 6.98; N, 3.01.

The unsolvated hydrochloride was obtained by heating the solvated salt at 80° C. in vacuo for a prolonged period.

EXAMPLE 6

2-(p-methoxyphenyl)-3-[p-(2-diethylaminoethoxy)phenyl]-6-methoxyindene and the hydroiodide thereof A solution of 4.0 g. (0.015 mole) of 2-(p-methoxyphenyl)-5-methoxy-1-indanone (Solmssen, J. Am. Chem. Soc., 65, 2370, 1943) in 100 ml. of tetrahydrofuran was added slowly with stirring to the Grignard reagent prepared from 4.80 g. (0.075 mole) of p-(2-diethylaminoethoxy)bromobenzene and 0.35 g. of magnesium in 40 ml. of tetrahydrofuran. The resulting mixture was heated under reflux for 16 hr. and then cooled to room temperature. The cooled mixture was treated with a small quantity of water and then filtered. The filtrate was diluted with ether and the organic layer was washed with water and brine before being evaporated to dryness. The residue was dissolved in ether and the ether solution was extracted with 0.5 N hydrochloric acid. The acid extract was extracted with six 50-ml. portitons of chloroform. The combined chloroform extracts were dried over anhydrous sodium sulfate and the dried solution was filtered. The filtrate was evaporated to dryness and the residue was heated under reflux for 1.5 hrs. with 150 ml. of benzene containing 0.15 g. of p-toluenesulfonic acid, the evolved water being collected in a water trap. The residual benzene solution was washed with aqueous sodium bicarbonate solution and water and then evaporated to dryness. There was thus obtained 2-(p-methoxyphenyl) - 3 - [p - (2-diethylaminoéthoxy)-phenyl]-6-methoxyindene in the form of a foam. The latter was dissolved in ether and the ether solution was extracted with aqueous 10% hydriodic acid. The acid extract was extracted with methylene chloride and the methylene chloride extract was dried over anhydrous sodium sulfate, filtered, and the filtrate evaporated to dryness. The residue was recrystallized from benzene. There was thus obtained a benzene solvate of 2-(p-methoxyphenyl)-3-[p-(2-diethylaminoethoxy)phenyl]-6-methoxyindene hydroiodide in the form of a crystalline solid having a melting point of 156 to 160° C. after softening and resolidifying at approximately 90° C.

*Analysis.*—Calcd. for $C_{29}H_{34}INO_3 \cdot \frac{1}{2}C_6H_6$: C, 62.94; H, 6.11; N, 2.29. Found: C, 63.09; H, 5.98; N, 2.45.

The unsolvated hydroiodide was obtained by heating the solvated salt at 70° C. for several hours.

EXAMPLE 7

2-phenyl-3-[p-(2-diethylaminoethoxy)phenyl]-5,6-dimethoxyindene and the hydrochloride thereof Using the procedure described in Example 2, part B, but replacing 2-(p-methoxyphenyl)-1-indanone by 2-phenyl-5,6-dimethoxy-1-indanone (Jocelyn, supra), there was obtained 2-phenyl-3-[p-(2 - diethylaminoethoxy)phenyl]-5,6-dimethoxyindene and the hydrochloride thereof. The hydrochloride was obtained as its hemihydrate in the form of a crystalline solid having a melting point of 210 to 212° C.

*Analysis.*—Calcd. for $C_{29}H_{34}ClNO_3 \cdot \frac{1}{2}H_2O$: C, 71.22; H, 7.21; N, 2.86. Found: C, 71.01; H, 7.06; N, 2.77.

The anhydrous hydrochloride was obtained by heating the hydrated salt at 100° C. in vacuo for a prolonged period.

EXAMPLE 8

2-(p-tolyl)-3-[p-(2-diethylaminoethoxy)phenyl]-6-methoxyindene and the hydrochloride thereof (A) 2-(p-tolyl)-5-methoxy - 1 - indanone.—Using the procedure described in Example 3, part A, but replacing benzyl chloride by m-methoxybenzyl chloride, there was obtained 2-(p-tolyl)-5-methoxy-1-indanone in the form of a crystalline solid having a melting point of 99 to 103° C.

*Analysis.*—Calcd. for $C_{17}H_{16}O_2$: C, 80.92; H, 6.39. Found: C, 80.99; H, 6.52.

(B) 2-(p-tolyl)-3-[p-(2 - diethylaminoethoxy)phenyl]-6-methoxyindene and the hydrochloride thereof.—Using the procedure described in Example 2, part B, but replacing 2-(p-methoxyphenyl)-1-indanone by 2-(p - tolyl)-5-methoxy-1-indanone, there was obtained 2-(p-tolyl)-3-[p-(2-diethylaminoethoxy)phenyl]-6-methoxyindene and the hydrochloride thereof. The hydrochloride was obtained in the form of an ethyl acetate solvate having a melting point of 212 to 215° C.

*Analysis.*—Calcd. for $C_{29}H_{34}ClNO_2 \cdot \frac{1}{4}CH_3CO_2C_2H_5$: C, 74.13; H, 7.47; N, 2.88. Found: C, 74.25; H, 7.20; N, 3.08.

EXAMPLE 9

2-(p-chlorophenyl)-3-[p-(2-diethylaminoethoxy)phenyl]indene and the hydrochloride thereof (A) 2-(p - chlorophenyl)-1-indanone.—A solution of potassium amide, prepared from 10.6 g. of potassium in 400 ml. of liquid ammonia, was added to a solution of 23.1 g. (0.136 mole) of p-chlorophenylacetic acid in 100 ml. of ether. The mixture was stirred for 5 minutes before adding slowly a solution of 19.0 g. of benzyl chloride in 100 ml. of ether. The mixture was then stirred at room temperature and, at intervals of 30 minutes, two further 5-g. portions of benzyl chloride were added. After the second addition had been made, the liquid ammonia was allowed to evaporate. The residue was dissolved in water and the aqueous solution so obtained was extracted with ether and then filtered through diatomaceous earth (Celite). The filtrate was acidified by the addition of concentrated hydrochloric acid and the solid which separated was isolated by filtration and recrystallized twice from a mixture of acetone and hexane. There was thus obtained 20 g. of α-benzyl-p-chlorophenylacetic acid in the form of a crystalline solid having a melting point of 112 to 116.5° C. An analytical sample having a melting point of 115 to 116.5° C. was obtained by further recrystallization from the above solvent mixture.

*Analysis.*—Calcd. for $C_{15}H_{13}ClO_2$: C, 69.10; H, 5.02. Found: C, 69.32; H, 5.24.

A solution of 20 g. of the α-benzyl-p-chlorophenylacetic acid so obtained in 40 ml. of methylene chloride was added to 120 ml. of liquid hydrogen fluoride. The two-phase mixture was stirred at 5 to 10° C. for 18 hrs. and then the hydrogen fluoride was allowed to evaporate at room temperature. The residue was dissolved in ether and the ether solution was washed successively with water, aqueous sodium bicarbonate solution, aqueous 0.5 N sodium hydroxide solution, and with brine. The washed ethereal solution was dried over anhydrous sodium sulfate, filtered, and the filtrate evaporated to dryness. The residue was recrystallized from aqueous methanol. There was thus obtained 2-(p-chlorophenyl)-1-indanone in the form of a crystalline solid having a melting point of 78 to 81° C. An analytical sample having a melting point of 79.5 to 81° C. was obtained by further recrystallization from aqueous methanol.

*Analysis.*—Calcd. for $C_{15}H_{11}ClO$: C, 74.23; H, 4.57. Found: C, 74.15; H, 4.39.

(B) 2 - (p - chlorophenyl) - 3 - [p - (2 - diethylaminoethoxy)phenyl]-indene and the hydrochloride thereof.—Using the procedure described in Example 2, part B, but replacing 2-(p-methoxyphenyl)-1-indanone by 2-(p-chlorophenyl)-1-indanone, there was obtained 2-(p-chlorophenyl)-3-[p-(2 - diethylaminoethoxy)phenyl]indene and the hydrochloride thereof. The hydrochloride, after two recrystallizations from a mixture of methylene chloride and ethyl acetate, was obtained in the form of an ethyl acetate solvate having a melting point of 206 to 208° C.

*Analysis.*—Calcd. for $C_{27}H_{29}Cl_2NO \cdot \frac{1}{4}CH_3CO_2C_2H_5$: C, 70.55; H, 6.53; N, 2.94. Found: C, 70.19, H, 6.87; N, 2.94.

EXAMPLE 10

2-(p-fluorophenyl)-3-[p-(diethylaminoethoxy)phenyl]-indene and the hydroiodide thereof (A) 2-(p-fluorophenyl)-1-indanone.—Using the procedure described in Example 3, part A, but replacing p-tolylacetic acid by p-fluorophenylacetic acid, there was obtained α-benzyl-p-fluorophenylacetic acid in the form of a crystalline solid having a melting point of 91 to 94° C. An analytical sample having a melting point of 93.5 to 95° C. was obtained by further recrystallization from a mixture of methylene chloride and hexane.

*Analysis.*—Calcd. for $C_{15}H_{13}FO_2$: C, 73.76; H, 5.36; F, 7.79. Found: C, 73.44; H, 5.78; F, 7.73.

The α-benzyl-p-fluorophenylacetic acid so obtained was then cyclized by treatment with liquid hydrogen fluoride using the procedure described in Example 3, part A, to obtain 2-(p-fluorophenyl)-1-indanone in the form of a crystalline solid having a melting point of 55.5 to 58° C. after two recrystallizations from hexane.

*Analysis.*—Calcd. for $C_{15}H_{11}FO$: C, 79.62; H, 4.90; F, 8.40. Found: C, 79.45; H, 5.01; F, 8.70.

(B) 2 - (p - fluorophenyl) - 3 - [p - (diethylaminoethoxy)phenyl]indene and the hydroiodide thereof.—Using the procedure described in Example 6, but replacing 2-(p-methoxyphenyl)-5-methoxy-1-indanone by 2-(p-fluorophenyl)-1-indanone, there was obtained 2-(p-fluorophenyl)-3 - [p - (diethylaminoethoxy)phenyl]indene and the hydroiodide thereof. The hydroiodide was obtained in the form of a crystalline solid having a melting point of 181 to 183° C. after two recrystallizations from methylene chloride and benzene.

*Analysis.*—Calcd. for $C_{27}H_{29}FINO$: C, 61.27; H, 5.52; F, 3.59; N, 2.65. Found: C, 61.22; H, 5.68; F, 3.61; N, 2.73.

EXAMPLE 11

2-(p-chlorophenyl)-3-[p-(2 - diethylaminoethoxy) - phenyl]-6-methoxyindene and the hydrochloride thereof (A) 2-(p-chlorophenyl)-5 - methoxy - 1 - indanone.— Using the procedure described in Example 3, part A, but replacing p-tolylacetic acid by p-chlorophenylacetic acid and benzyl chloride by m-methoxybenyl chloride, there was obtained α-(m-methoxybenzyl)-p-chlorophenylacetic acid in the form of a crystalline solid having a melting point of 93 to 95° C. after recrystallization from a mixture of hexane and acetone.

*Analysis.*—Calcd. for $C_{16}H_{15}ClO_3$: C, 66.09; H, 5.20. Found: C, 66.24; H, 4.88.

The α-(m-methoxybenzyl) - p - chlorophenylacetic acid so obtained was then cyclized by treatment with liquid hydrogen fluoride using the procedure described in Example 3, part A, to obtain 2-(p-chlorophenyl)-5-methoxy-1-indanone in the form of a crystalline solid having a melting point of 116.5 to 119° C. after recrystallization from ethanol.

*Analysis.*—Calcd. for $C_{16}H_{13}ClO$: C, 70.45; H, 4.80; Cl, 13.00. Found: C, 70.12; H, 4.55; Cl. 12.84.

(B) 2 - (p - chlorophenyl) - 3 - [p - (2 - diethylaminoethoxy)phenyl]-6-methoxyindene and the hydrochloride thereof.—Using the procedure described in Example 2, part B, but replacing 2-(p-methoxyphenyl)-1-indanone by 2-(p-chlorophenyl)-5-methoxy-1-indanone, there was obtained 2 - (p - chlorophenyl) - 3 - [p - (2 - diethylaminoethoxy)phenyl]-6-methoxyindene and the hydrochloride thereof. The hydrochloride was obtained as a crystalline solid having a melting point of 199 to 201° C. after recrystallization from the mixture of methylene chloride and ethyl acetate.

Analysis.—Calcd. for $C_{28}H_{31}Cl_2NO_2$: C, 69.41; H, 6.45; N, 2.91. Found: C, 69.43; H, 6.48; N, 2.89.

EXAMPLE 12

2-phenyl-3-[p-(3-dimethylaminopropoxy)phenyl]-6-methoxyindene and the hydrochloride thereof Using the procedure described in Example 5, but replacing p-(2-diethylaminoethoxy)bromobenzene by p-(3-dimethylaminopropoxy)benzene, there is obtained 2-phenyl - 3 - [p - (3 - dimethylaminopropoxy)phenyl] - 6-methoxyindene and the hydrochloride thereof.

EXAMPLE 13

2-phenyl-3-[p-(2-diethylaminopropoxy)phenyl]-6-methoxyindene and the hydrochloride thereof Using the procedure described in Example 5, but replacing p-(2-diethylaminoethoxy)bromobenzene by p-(2-diethylaminopropoxy)bromobenzene, there is obtained 2-phenyl-3-[p-(2-diethylaminopropoxy)phenyl] - 6 - methoxyindene and the hydrochloride thereof.

EXAMPLE 14

2-phenyl-3-[p-(2-dibutylaminoethoxy)phenyl]-6-methoxyindene and the hydrochloride thereof Using the procedure described in Example 5, but replacing p-(2-diethylaminoethoxy)bromobenzene by p-(2-dibutylaminoethoxy)bromobenzene, there is obtained 2-phenyl-3-[p - (2 - dibutylaminoethoxy)phenyl] - 6 - methoxyindene and the hydrochloride thereof.

EXAMPLE 15

2-phenyl-3-[p-(2-N-methyl-N-ethylaminoethoxy)phenyl]-6-methoxyindene and the hydrochloride thereof Using the procedure described in Example 5, but replacing p-(2-diethylaminoethoxy)bromobenzene by p-(2-N-methyl - N - ethylaminoethoxy)bromobenzene, there is obtained 2 - phenyl - 3 - [p - (2 - N - methyl - N - ethylaminoethoxy)phenyl] - 6 - methoxyindene and the hydrochloride thereof.

EXAMPLE 16

2-phenyl-3-[p-(3-diethylaminobutoxy)phenyl]-6-methoxyindene and the hydrochloride thereof Using the procedure described in Example 5, but replacing p-(2-diethylaminoethoxy)bromobenzene by p-(3-diethylaminobutoxy)bromobenzene, there is obtained 2-phenyl-3-[p-(3 - diethylaminobutoxy)phenyl] - 6 - methoxyindene and the hydrochloride thereof.

EXAMPLE 17

2-phenyl-3-[p-(5-dimethylaminopentoxy)phenyl]-6-methoxyindene and the hydrochloride thereof Using the procedure described in Example 5, but replacing p-(2-diethylaminoethoxy)bromobenzene by p-(5-dimethylaminopentoxy)bromobenzene, there is obtained 2-phenyl - 3 - [p-(5 - dimethylaminopentoxy)phenyl]-6-methoxyindene and the hydrochloride thereof.

EXAMPLE 18

2-phenyl-3-[p-(2-diethylaminopentoxy)phenyl]-6-methoxyindene and the hydrochloride thereof Using the procedure described in Example 5, but replacing p-(2-diethylaminoethoxy)bromobenzene by p-(2-diethylaminopentoxy)bromobenzene, there is obtained 2-phenyl - 3 - [p-(2-diethylaminopentoxy)phenyl]-6-methoxyindene and the hydrochloride thereof.

EXAMPLE 19

2-phenyl-3-[p-(6-dimethylaminohexyloxy)phenyl]-6-methoxyindene and the hydrochloride thereof Using the procedure described in Example 5, but replacing p-(2-diethylaminoethoxy)bromobenzene by p-(6-dimethylaminohexyloxy)bromobenzene, there is obtained 2 - phenyl - 3 - [p-(6-dimethylaminohexyloxy)phenyl]-6-methoxyindene and the hydrochloride thereof.

EXAMPLE 20

2-phenyl-3-[p-(2-pyrrolidinoethoxy)phenyl]-6-methoxyindene and the hydrochloride thereof Using the procedure described in Example 5, but replacing p-(2-diethylaminoethoxy)bromobenzene by p-(2-pyrrolidinoethoxy)bromobenzene, there is obtained 2-phenyl - 3 - [p-(2 - pyrrolidinoethoxy)phenyl]-6-methoxyindene and the hydrochloride thereof.

EXAMPLE 21

2-phenyl - 3 - {p - [3-(2,2-dimethylpyrrolidino)propoxyl]phenyl}-6-methoxyindene and the hydrochloride thereof Using the procedure described in Example 5, but replacing p-(2-diethylaminoethoxy)bromobenzene by p-[3-(2,2 - dimethylpyrrolidino)propoxy]bromobenzene, there is obtained 2-phenyl-3-{p-[3-(2,2-dimethylpyrrolidino)propoxy]phenyl}-6-methoxyindene and the hydrochloride thereof.

EXAMPLE 22

2-phenyl-3-[p-(2-piperidinoethoxy)phenyl]-6-methoxyindene and the hydrochloride thereof Using the procedure described in Example 5, but replacing p-(2-diethylaminoethoxy)bromobenzene by p-(2-piperidinoethoxy)bromobenzene, there is obtained 2-phenyl-3-[p-(2-piperidinoethoxy)phenyl] - 6 - methoxyindene and the hydrochloride thereof.

EXAMPLE 23

2-phenyl-3-[p-(2-morpholinoethoxy)phenyl]-6-methoxyindene and the hydrochloride thereof Using the procedure described in Example 5, but replacing p-(2-diethylaminoethoxy)bromobenzene by p-(2-morpholinoethoxy)bromobenzene, there is obtained 2-phenyl-3-[p-(2-morpholinoethoxy)phenyl] - 6 - methoxyindene and the hydrochloride thereof.

EXAMPLE 24

2-phenyl-3-{p-[2-(1' - methyl-4'-piperazino)ethoxy]phenyl}-6-methoxyindene and the hydrochloride thereof Using the procedure described in Example 5, but replacing p-(2-diethylaminoethoxy)bromobenzene by p-[2-(1'-methyl-4'-piperazino)ethoxy]bromobenzene, there is obtained 2-phenyl-3-{p-[2-(1'-methyl - 4' - piperazino)ethoxy]phenyl}-6-methoxyindene and the hydrochloride thereof.

EXAMPLE 25

2-phenyl-3-[p-(2-hexamethyleneiminoethoxy)phenyl]-6-methoxyindene and the hydrochloride thereof Using the procedure described in Example 5, but replacing p-(2-diethylaminoethoxy)bromobenzene by p-(2-hexamethyleneiminoethoxy)bromobenzene, there is obtained 2-phenyl - 3 - [p-hexamethyleneiminoethoxy)phenyl]-6-methoxyindene and the hydrochloride thereof.

EXAMPLE 26

2-phenyl-3-[p-(2-homopiperazinoethoxy)phenyl]-6-methoxyindene and the hydrochloride thereof Using the procedure described in Example 5, but replacing p-(2-diethylaminoethoxy)bromobenzene by p-(2-homopiperazinoethoxy)bromobenzene, there is obtained 2-phenyl - 3 - [p-(2-homopiperazinoethoxy)phenyl]-6-methoxyindene and the hydrochloride thereof.

EXAMPLE 27

2-phenyl-3-[p-(2-homomorpholinoethoxy)phenyl]-6-methoxyindene and the hydrochloride thereof

Using the procedure described in Example 5, but replacing p-(2-diethylaminoethoxy)bromobenzene by p-(2-homomorpholinoethoxy)bromobenzene, there is obtained 2-phenyl - 3 - [p-(2-homomorpholinoethoxy)phenyl]-6-methoxyindene and the hydrochloride thereof.

EXAMPLE 28

2-phenyl-3-[p-(2-diethylaminoethoxy)phenyl-6-isopropoxyindene and the hydrochloride thereof

Using the procedure described in Example 2, part B, but replacing 2-(p-methoxyphenyl)-1-indanone by 5-isopropoxy-2-phenyl-1-indanone (Morris, J. Chem. Soc., 1950, 1913), there is obtained 2-phenyl-3-[p-(2-diethylaminoethoxy)phenyl]-6-isopropoxyindene and the hydrochloride thereof.

EXAMPLE 29

2-(m-trifluoromethylphenyl)-3-[p-(2-diethylaminoethoxy)phenyl]indene and the hydrochloride thereof

(A) 2 - (m - trifluoromethylphenyl)-1-indanone.—Using the procedure described in Example 2, part A, but replacing p-methoxyphenylacetic acid by m-trifluoromethylphenylacetic acid, (Corse et al., J. Am. Chem. Soc., 70, 2837, 1948) there is obtained 2-(m-trifluoromethylphenyl)-1-indanone.

(B) 2-(m-trifluoromethylphenyl) - 3 - [p-(2 - diethylaminoethoxy)phenyl]indene and the hydrochloride thereof.—Using the procedure described in Example 2, part B, but replacing 2-(p-methoxyphenyl)-1-indanone by 2-(m-trifluoromethylphenyl)-1-indanone, there is obtained 2-(m-trifluoromethylphenyl) - 3 - [p-(2 - diethylaminoethoxy)phenyl]indene and the hydrochloride thereof.

EXAMPLE 30

2 - (p-methoxyphenyl) - 3 - [p-(2-diethylaminoethoxy)phenyl]-5-trifluoromethylindene and the hydrochloride thereof

(A) 2 - (p - methoxyphenyl)-6-trifluoromethyl-1-indanone.—Using the procedure described in Example 2, part A, but replacing benzyl chloride by p-trifluoromethylbenzyl chloride, there is obtained 2-(p-methoxyphenyl)-6-trifluoromethyl-1-indanone.

(A) 2 - (p - methoxyphenyl-3-[p-(2 - diethylaminoethoxy)phenyl]-5-trifluoromethylindene and the hydrochloride thereof.—Using the procedure described in Example 2, part B, but replacing 2-(p-methoxyphenyl)-1-indanone by 2 - (p-methoxyphenyl)-6-trifluoromethyl-1-indanone, there is obtained 2-(p-methoxyphenyl)-3-[p-diethylaminoethoxy)phenyl] - 5 - trifluoromethyl-indene and the hydrochloride thereof.

EXAMPLE 31

2 - (p-methoxyphenyl) - 3 - [p-(2-diethylaminoethoxy)-phenyl]-5-(1,3-dimethylbutyl)indene and the hydrochloride thereof

(A) 2 - (p - methoxyphenyl)-6-(1,3-dimethylbutyl)-1-indanone.—Using the procedure described in Example 2, part A, but replacing benzyl chloride by p-(1,3-dimethylbutyl)benzyl chloride (U.S. Patent 2,569,408), there is obtained 2-(p-methoxyphenyl-6-(1,3-dimethylbutyl)-1-indanone.

(B) 2 - (p - methoxyphenyl)-3-[p-(2-diethylaminoethoxy)phenyl]-5-(1,3-dimethylbutyl)indene and the hydrochloride thereof.—Using the procedure described in Example 2, part B, but replacing 2-(p-methoxyphenyl)-1-indanone by 2-(p-methoxyphenyl)-6-(1,3-dimethylbutyl)-1-indanone, there is obtained 2-(p-methoxyphenyl)-3-[p-(2-diethylaminoethoxy)phenyl] - 5 - (1,3-dimethylbutyl)indene and the hydrochloride thereof.

EXAMPLE 32

2 - (p - methylmercaptophenyl-3-[p - (2 - diethylaminoethoxy)phenyl]indene and the hydrochloride thereof

(A) 2 - (p - methylmercaptophenyl)-1-indanone.—Using the procedure described in Example 2, part A, but replacing p-methoxyphenylacetic acid by p-methylmercaptophenylacetic acid (Corse et al., supra), there is obtained 2-(p-methylmercaptophenyl)-1-indanone.

(B) 2 - (p - methylmercaptophenyl)-3-[p-(2-diethylaminoethoxy)phenylindene and the hydrochloride thereof.—Using the procedure described in Example 2, part B, but replacing 2-(p-methoxyphenyl)-1-indanone by 2-(p-methylmercaptophenyl)-1-indanone, there is obtained 2-(p-methylmercaptophenyl) - 3 - [p - (2-diethylaminoethoxy)phenyl]indene and the hydrochloride thereof.

EXAMPLE 33

2-(-p-phenoxyphenyl)-3-[p-(2-diethylaminoethoxy)-phenyl]indene and the hydrochloride thereof

(A) 2-(p-phenoxyphenyl) - 1 - indanone.—Using the procedure described in Example 2, part A, but replacing p-methoxyphenylacetic acid by p-phenoxyphenylacetic acid (Corse et al., supra), there is obtained 2-(p-phenoxyphenyl)-1-indanone.

(B) 2 - (p - phenoxyphenyl)-3-[p-(2 - diethylaminoethoxy)phenyl]indene and the hydrochloride thereof.—Using the procedure described in Example 2, part B, but replacing 2-(p-methoxyphenyl)-1-indanone by 2-(p-phenoxyphenyl)-1-indanone, there is obtained 2-(p-phenoxyphenyl) - 3 - [p-(2-diethylaminoethoxy)phenyl]indene and the hydrochloride thereof.

EXAMPLE 34

2 - (p - phenylmercaptophenyl) - 3 - ]p-(2-diethylaminoethoxy)phenyl]indene and the hydrochloride thereof

(A) 2 - (p - phenylmercaptophenyl)-1-indanone.—Using the procedure described in Example 2, part A, but replacing p-methoxyphenylacetic acid by p-phenylmercaptophenylacetic acid (Corse et al., supra), there is obtained 2-(p-phenylmercaptophenyl)-1-indanone.

(B) 2 - (p - phenylmercaptophenyl)-3-[p-(2-diethylaminoethoxy)phenyl]indene and the hydrochloride thereof.—Using the procedure described in Example 2, part B, but replacing 2-(p-methoxyphenyl)-1-indanone by 2-(p-phenylmercaptophenyl)-1-indanone, there is obtained 2-(p-phenylmercaptophenyl - 3 - [p - (2 - diethylaminoethoxy)phenyl]indene and the hydrochloride thereof.

EXAMPLE 35

2-(p-hydroxyphenyl)-3-[p-(2-diethylaminoethoxy)-phenyl]indene hydrochloride

(A) 2 - (p - hydroxyphenyl) - 1 - indanone.—Heating a mixture of 2-(p-methoxyphenyl)-1-indanone (Example 2, part A) with aluminum bromide in benzene according to the procedure described by Sam, J. Am. Chem. Soc., 82, 5205, 1960, yields 2-(p-hydroxyphenyl)-1-indanone in the form of a crystalline compound.

(B) 2 - (p - 2 - tetrahydropyranyloxyphenyl)-1-indanone.—A solution of 2-(p-hydroxyphenyl)-1-indanone in ether is treated with an equimolar quantity of 2,3-dihydropyran and one drop of concentrated hydrochloric acid. The mixture so obtained is allowed to stand for several hours, washed with very dilute aqueous sodium hydroxide solution, then with water, and taken to dryness. There is thus obtained 2-(p-2-tetrahydropyranyloxyphenyl)-1-indanone.

(C) 2 - (p - hydroxyphenyl) - 3 - [p - (2-diethylaminoethoxy)phenyl]indene hydrochloride.—Using the procedure described in Example 2, part B, but replacing 2-(p-methoxyphenyl)-1-indanone by 2-(p-2-tetrahydropyranyloxyphenyl)-1-indanone and allowing the 0.5 N hydrochloric acid extract obtained in the working up to stand for several hours to enable the hydrolysis of the tetrahydropyranyl ether to proceed to completion before finally extracting with methylene chloride, there is obtained 2-(p-hydroxyphenyl)-3-[p-(2-diethylaminoethoxy)phenyl]indene hydrochloride.

EXAMPLE 36

2-(p-allyloxyphenyl)-3-[p-(2-diethylaminoethoxy)-phenyl]indene hydrochloride (A) 2-(p - allyloxyphenyl) - 1 - indanone.—A solution of 2-(p-hydroxyphenyl)-1-indanone (Example 35, part B) in methanol containing a slight excess of sodium methoxide is treated slowly with stirring with an excess of allyl chloride. When the addition is complete the mixture is heated under reflux for several hours before being cooled and poured into water. The resulting mixture is extracted with ether and the ethereal extract is washed with aqueous sodium hydroxide solution and with water before being evaporated to dryness to yield 2-p-(allyloxyphenyl)-1-indanone.

(B) 2-(p-allyloxyphenyl)-3-[p-(2-diethylaminoethoxy)phenyl]indene hydrochloride.—Using the procedure described in Example 2, part B, but replacing 2-(p-methoxyphenyl)-1-indanone by 2-(p-allyloxyphenyl)-1-indanone, there is obtained 2-(p-allyloxyphenyl)-3-[p-(2-diethylaminoethoxy)phenyl]indene hydrochloride.

EXAMPLE 37

1-methyl-2-phenyl-3-[p-(2-diethylaminoethoxy)phenyl]indene and the hydrobromide thereof (A) 3-methyl-2-phenyl-1-indanone.—2,3-diphenylbutyric acid (Hauser et al., J. Am. Chem. Soc., 80, 4345, 1958) is cyclized with liquid hydrogen fluoride using the procedure of Example 3, part A, to obtain 3-methyl-2-phenyl-1-indanone.

(B) 1-methyl-2-phenyl-3-[p - (2 - diethylaminoethoxy)phenyl]indene and the hydrobromide thereof.—Using the procedure described in Example 3, part B, but replacing 2-(p-tolyl)-1-indanone by 3-methyl-2-phenyl-1-indanone, there is obtained 1-methyl-2-phenyl-3-[p-(2-diethylaminoethoxy)phenyl]indene and the hydrobromide thereof.

EXAMPLE 38

1-propyl-2-(p-tolyl)-3-[p-(2-diethylaminoethoxy)phenyl]indene and the hydrobromide thereof (A) 3-propyl-2-(p-tolyl)-1-indanone.—Using the procedure described in Example 3, part A, but replacing benzyl chloride by α-propylbenzyl chloride (Engler and Bethge, Ber., 7, 1125, 1874), there is obtained 3-propyl-2-(p-tolyl)-1-indanone.

(B) 1-propyl-2-(p-tolyl)-3-[p-(2-diethylaminoethoxy)phenyl]indene and the hydrobromide thereof.—Using the procedure described in Example 3, part B, but replacing 2-(p-tolyl)-1-indanone by 3-propyl-2-(p-tolyl)-1-indanone, there is obtained 1-propyl-2-(p-tolyl)-3-[p-(2-diethylaminoethoxy)phenyl]indene and the hydrobromide thereof.

EXAMPLE 39

2-(3-allyl-4-methoxyphenyl)-3-[p-(2-diethylaminoethoxy)phenyl]indene and the hydrochloride thereof (A) 2-(3-allyl-4-methoxyphenyl)-1-indanone.—Using the procedure described in Example 2, part A, but replacing p-methoxyphenylacetic acid by 3-allyl-4-methoxyphenylacetic acid (Van der Zanden and De Vries, Rec. Trav. Chim., 71, 879, 1952), there is obtained 2-(3-allyl-4-methoxyphenyl)-1-indanone.

(B) 2-(3-allyl-4-methoxyphenyl)-3-[p-(2-diethylaminoethoxy)phenyl]indene and the hydrochloride thereof.— Using the procedure described in Example 2, part B, but replacing 2-(p-methoxyphenyl)-1-indanone by 2-(3-allyl-4-methoxyphenyl)-1-indanone, there is obtained 2-(3-allyl - 4 - methoxyphenyl)-3-[p-(2-diethylaminoethoxy)phenyl]indene and the hydrochloride thereof.

EXAMPLE 40

2 - (m - methoxyphenyl) - 3 - [p - (2 - diethylaminoethoxy)phenyl]-6-methoxyindene and the hydrochloride thereof (A) 2 - (m-methoxyphenyl)-5-methoxy-1-indanone.— Using the procedure described in Example 2, part A, but replacing p-methoxyphenylacetic acid by m-methoxyphenylacetic acid and benzyl chloride by m-methoxybenzyl chloride, there was obtained α-(m-methoxybenzyl)-m-methoxyphenylacetic acid having a melting point of 90.5 to 93° C. after recrystallization from cyclohexane.

Analysis.—Calcd. for $C_{17}H_{18}O_4$: C, 71.31; H, 6.34. Found: C, 71.61; H, 6.26.

The α-(m-methoxybenzyl)-m-methoxyphenylacetic acid so obtained was then cyclized with liquid hydrogen fluoride using the procedure described in Example 2, part A, to obtain 2-(m-methoxyphenyl)-5-methoxy-1-indanone having a melting point of 93 to 96° C. after recrystallization from methanol.

Analysis.—Calcd. for $C_{17}H_{16}O_3$: C, 76.10; H, 6.01. Found: C, 76.65; H, 6.32.

(B) 2 - (m - methoxyphenyl)-3-[p-(2-diethylaminoethoxy)phenyl]-6-methoxyindene and the hydrochloride thereof.—Using the procedure described in Example 2, part B, but replacing 2-(p-methoxyphenyl)-1-indanone by 2-(m-methoxyphenyl)-5-methoxy-1-indanone, there was obtained 2-(m-methoxyphenyl)-3-[p-(2-diethylaminoethoxy)phenyl]-6-methoxyindene and the hydrochloride thereof. The hydrochloride was obtained as a crystalline solid having a melting point of 181 to 182° C. after recrystallization from a mixture of chloroform and ethyl acetate.

Analysis.—Calcd. for $C_{29}H_{34}ClNO_3$: C, 72.56; H, 7.14; N, 2.92. Found: C, 72.56; H, 6.97; N, 3.15.

EXAMPLE 41

2-(p-methoxyphenyl)-3-[p-(2-diethylaminoethoxy)phenyl]-6-methoxyindene methiodide A mixture of 1 g. of 2-(p-methoxyphenyl)-3-[p-(2-diethylaminoethoxy)phenyl] - 6 - methoxyindene hydroiodide (Example 6), 100 ml. of ether and 50 ml. of saturated aqueous sodium carbonate solution was shaken until all the solid dissolved. The organic layer was separated, washed with brine and dried over anhydrous sodium sulfate. The dried solution was filtered and the filtrate was evaporated to dryness. The residue was dissolved in 12 ml. of acetonitrile and the solution so obtained was cooled in ice. To the cooled solution was added 1.5 ml. of methyl iodide and the mixture was allowed to stand overnight before being poured into 100 ml. of ether. The solid which separated was isolated by filtration and recrystallized twice from acetonitrile-ethyl acetate mixture. There was thus obtained 0.7 g. of 2-(p-methoxyphenyl)-3-[p-(2-diethylaminoethoxy)phenyl]-6-methoxyindene methiodide in the form of a crystalline solid having a melting point of 183 to 185° C.

Analysis.—Calcd. for $C_{30}H_{36}INO_3$: C, 61.54; H, 6.20; N, 2.39. Found: C, 61.76; H, 6.26; N, 2.36.

Similarly using the above procedure, but replacing methyl iodide by ethyl bromide, propyl bromide, allyl bromide, and benzyl bromide, there are obtained the ethobromide, propyl bromide, allyl bromide, and benzyl bromide, respectively, of 2-(p-methoxyphenyl)-3-[p-(2-diethylaminoethoxy)phenyl]-6-methoxyindene.

EXAMPLE 42

2-phenyl-3-[p-(2-diethylaminoethoxy)phenyl]-6-methoxyindene methiodide

Using the procedure described in Example 41, but replacing 2-(p-methoxyphenyl) - 3 - [p - (2 - diethylaminoethoxy)phenyl]-6-methoxyindene hydroiodide by 2-phenyl - 3 - [p - (2 - diethylaminoethoxy)phenyl]-6-methoxyindene hydrochloride (Example 5), there is obtained 2-phenyl-3-[p-(2 - diethylaminoethoxy)phenyl]-6-methoxyindene methiodide.

Using the above procedure, but replacing 2-phenyl-3-[p-(2-diethylaminoethoxy)phenyl]-6 - methoxyindene hydrochloride by the appropriately substituted indene acid addition salt, there are obtained the methiodides of 2-phenyl-3-[p-(2-diethylaminoethoxy)phenyl]indene,
2-(p-methoxyphenyl)-3-[p-(2-diethylaminoethoxy) phenyl]indene,
2-(p-tolyl)-3-[p-(2-diethylaminoethoxy)phenyl]indene,
2-phenyl-3-[p-(2-diethylaminoethoxy)phenyl]-5-methoxyindene,
2-phenyl-3-[p-(2-diethylaminoethoxy)phenyl]-5,6-dimethoxyindene,
2-(p-tolyl)-3-[p-(2-diethylaminoethoxy)phenyl]-6-methoxyindene,
2-(p-chlorophenyl)-3-[p-(2-diethylaminoethoxy)phenyl] indene,
2-(p-fluorophenyl)-3-[p-(2-diethylaminoethoxy)phenyl] indene, and
2-(p-chlorophenyl)-3-[p-(2-diethylaminoethoxy)phenyl]-6-methoxyindene.

EXAMPLE 43

2-phenyl-3-[p(2-diethylaminoethoxy)phenyl]-6-methoxyindene N-oxide and the hydrochloride thereof A mixture of 1 g. of 2-phenyl-3-[p-(2-diethylaminoethoxy)phenyl] - 6 - methoxyindene hydrochloride (Example 5), 100 ml. of ether, and 50 ml. of saturated aqueous sodium carbonate solution is shaken until all the solid dissolves. The ether solution is separated, washed with brine and dried over anhydrous sodium sulfate. The dried solution is filtered and the filtrate is evaporated to dryness. The residue is dissolved in 50 ml. of absolute ethanol and to the solution is added an equimolar quantity of 30% hydrogen peroxide. The mixture is allowed to stand for 4 days at room temperature, at the end of which time the mixture is shaken with 0.5 g. of platinum oxide until a test for peroxide is negative. The mixture is then filtered and the filtrate is evaporated to dryness under reduced pressure. The residue is recrystallized from chloroform-ethyl acetate mixture. There is thus obtained 2 - phenyl - 3 - [p - (2 - diethylaminoethoxy)phenyl] - 6-methoxyindene N-oxide.

The N-oxide so obtained is converted to the corresponding hydrochloride by dissolving the N-oxide in ether and treating the ether solution with an excess of a saturated solution of hydrogen chloride in ether. The solid which separates is isolated by filtration. There is thus obtained 2 - phenyl - 3 - [p-(2-diethylaminoethoxy) phenyl]-6-methoxyindene N-oxide hydrochloride.

Using the above procedure, but replacing 2-phenyl-3-[p - (2 - diethylaminoethoxy)phenyl] - 6 - methoxyindene hydrochloride by the appropriately substituted indene acid addition salt, there is obtained 2-phenyl-3-[p-(2-diethylaminoethoxy)phenyl]indene N-oxide,
2-(p-methoxyphenyl)-3-[p-(2-diethylaminoethoxy) phenyl]indene N-oxide,
2-(p-tolyl)-3-[p-(2-diethylaminoethoxy)phenyl]indene N-oxide,
2-phenyl-3-[p-(2-diethylaminoethoxy)phenyl]-5-methoxyindene N-oxide,
2-phenyl-3-[p-(2-diethylaminoethoxy)phenyl]-5,6-dimethoxyindene N-oxide,
2-(p-tolyl)-3-[p-(2-diethylaminoethoxy)phenyl]-6-methoxyindene N-oxide,
2-(p-chlorophenyl)-3-[p-(2-diethylaminoethoxy)phenyl] indene N-oxide,
2-(p-fluorophenyl)-3-[p-(2-diethylaminoethoxy)phenyl] indene N-oxide, and
2-(p-chlorophenyl)-3-[p-(2-diethylaminoethoxy)phenyl]-6-methoxyindene N-oxide and
the hydrochlorides thereof.

EXAMPLE 44

1-[p-(2-diethylaminoethoxy)phenyl]-2-phenyl - 6 - methoxy - 3,4 - dihydronaphthalene and the hydrochloride thereof To 0.73 g. of dry magnesium chips maintained in an atmosphere of nitrogen was added 5 ml. of tetrahydrofuran and 4 drops of methyl iodide and the mixture was stirred until reaction started. To the resulting mixture was added a solution of 8.15 g. of p-(2-diethylaminoethoxy)-bromobenzene in 85 ml. of tetrahydrofuran. The resulting mixture was heated under reflux until substantially all of the magnesium had been consumed and to the residual solution was added with stirring a solution of 7.55 g. of 2 - phenyl - 6 - methoxy - 1,2,3,4 - tetrahydro - 1 - naphthalenone in 90 ml. of tetrahydrofuran. The mixture so obtained was heated under reflux for 16 hours before being cooled. The cooled solution was treated with ether and a small quantity of water. The gel which formed was removed by filtration and washed well with ether. The ether filtrate and washings were combined and washed with water before being dried over anhydrous sodium sulfate and evaporated to dryness. The residual oil was dissolved in a mixture of ether and benzene and the solution so obtained was extracted with excess 0.5 N hydrochloric acid. The acid extract was extracted with methylene chloride and the methylene chloride extract was evaporated to dryness. The residue (6.48 g.) was recrystallized from a mixture of chloroform and ethyl acetate. There was thus obtained 3.42 g. of 1-[p-(2-diethylaminoethoxy)phenyl] - 2 - phenyl - 6 - methoxy - 3,4 - dihydronaphthalene hydrochloride in the form of a crystalline solid having a melting point of 171 to 173° C. after partially melting and resolidifying at 126° C. An analytical sample was obtained by drying for 96 hours at 110° C. in vacuo.

*Analysis.*—Calcd. for $C_{29}H_{34}ClNO_2$: C, 75.06; H, 7.39; N, 3.02. Found: C, 74.74; H, 7.40; N, 3.03.

A solution of 1 g. of the above hydrochloride in water was made basic by the addition of aqueous sodium hydroxide solution. The basic solution was extracted with ether, washed with water and dried over anhydrous sodium sulfate. The dried solution was filtered and the filtrate was evaporated to dryness. The residue was recrystallized from aqueous ethanol to obtain 1-[p-(2-diethylaminoethoxy)phenyl] - 2 - phenyl - 6 - methoxy - 3,4 - dihydronaphthalene in the form of a crystalline solid.

EXAMPLE 45

1-[p-(2-diethylaminoethoxy)phenyl]-2-phenyl-3,4-dihydronaphthalene and the hydrochloride thereof A solution of 11.0 g. (0.05 mole) of 2-phenyl-1,2,3,4-tetrahydro-1-naphthalenone (Newman, J. Am. Chem. Soc., 60, 2947, 1938) in 100 ml. of tetrahydrofuran was added to the Grignard reagent prepared from 13.6 g. (0.05 mole) of p-(2-diethylaminoethoxy)bromobenzene and 1.24 g. (0.05 mole) of magnesium in 130 ml. of tetrahydrofuran. The resulting mixture was heated for 16 hours under reflux and was then allowed to cool and treated with 5 ml. of water. The resulting gel was removed by filtration and the filtrate was diluted with ether, washed with water and evaporated to dryness. The residue was taken up in ether and the solution so obtained was washed with 0.5 N hydrochloric acid. The acid extract was extracted with 250 ml. of chloroform and the chloroform extract was evaporated to dryness. The residue was dissolved in 250 ml. of benzene and the benzene solution was heated with 250 mg. of p-toluenesulfonic acid for 2 hours under a Dean-Stark trap. The solution was then allowed to cool and was washed with aqueous sodium bicarbonate solution. The washed benzene solution was evaporated to dryness and the residue was dissolved in ether. The ether solution was extracted with 0.5 N hydrochloric acid and the acid extract was extracted with chloroform. The chloroform extract was evaporated to dryness and the residue was recrystallized twice from a mixture of methylene chloride and benzene. There was thus obtained 6.30 g. of 1-[p-(2-diethylaminoethoxy)phenyl] - 1-hydroxy-2-phenyl-1,2,3,4-tetrahydronaphthalene hydrochloride in the form of a crystalline solid having a melting point of 180 to 182° C. (with decomposition).

*Analysis.*—Calcd. for $C_{28}H_{34}ClNO_2$: C, 74.39; H, 7.58; N, 3.10. Found: C, 74.04; H, 7.55; N, 2.93.

One-half gram of the above compound was heated under a gentle stream of nitrogen in an oil bath at 200 to 210° C. until no more effervescence occurred. The residual glass was crystallized by trituration with ethyl acetate. The product was then recrystallized from a mixture of methylene chloride and ethyl acetate. There was thus obtained 0.45 g. of 1-[p-(2-diethylaminoethoxy)phenyl]-2-phenyl-3,4-dihydronaphthalene hydrochloride in the form of a crystalline solid having a melting point of 174 to 177° C. An analytical sample having a melting point of 174 to 178° C. was obtained by two further recrystallizations from the same solvent mixture. The ultraviolet spectrum of this compound (ethanol solution) exhibited maxima at 230, 238 (sh.), 253 (sh.), 280 (sh), and 299 millimicrons.

*Analysis.*—Calcd. for $C_{28}H_{32}ClNO$: C, 76.84; H, 7.29; N, 3.16. Found: C, 76.13; H, 7.21; N, 73.34.

The corresponding free base was obtained from the above hydrochloride in the form of a crystalline solid using the procedure described in Example 44.

EXAMPLE 46

1 - [p - (2 - diethylaminoethoxy)phenyl] - 2 - o - tolyl-methyl-3,4-dihydronaphthalene and the hydrochloride thereof Using the procedure described in Example 44, but replacing 2 - phenyl - 6-methoxy-1,2,3,4-tetrahydro-1-naphthalenone by 2 - o - tolyl - 3-methyl-1,2,3,4-tetrahydro-1-naphthalenone (Newman, J. Am. Chem. Soc. 62, 2295, 1940) there is obtained 1-[p-(2-diethylaminoethoxy)phenyl] - 2 - o-tolyl-3-methyl-3,4-dihydronaphthalene and the hydrochloride thereof.

EXAMPLE 47

1-[p-(2-diethylaminoethoxy)phenyl]-2-phenyl-7-7-amyl-3,4-dihydronaphthalene and the hydrochloride thereof Using the procedure described in Example 44, but replacing 2 - phenyl - 6-methoxy-1,2,3,4-tetrahydro-1-naphthalenone by 2-phenyl-7-amyl-1,2,3,4-tetrahydro-1-naphthalenone, there is obtained 1-[p-(2-diethylaminoethoxy)phenyl]-2-phenyl-7-amyl-3,4-dihydronaphthalene and the hydrochloride thereof.

EXAMPLE 48

1-[p-(2-diethylaminoethoxy)phenyl]-2-phenyl-6-bromo-3,4-dihydronapthalene and the hydrochloride thereof Using the procedure described in Example 44, but replacing 2 - phenyl - 6-methoxy-1,2,3,4-tetrahydro-1-naphthalenone by 2-phenyl-6-bromo-1,2,3,4-tetrahydro-1-naphthanenone, there is obtained 1-[p-(2-diethylaminoethoxy)phenyl] - 2 - phenyl-6-bromo-3,4,-dihydronaphthalene and the hydrochloride thereof.

EXAMPLE 49

1-[p-(2-diethylaminoethoxy)phenyl]-2-phenyl-7-chloro-3,4-dihydronaphthalene and the hydrochloride thereof Using the procedure described in Example 44, but replacing 2 - phenyl - 6-methoxy-1,2,3,4-tetrahydro-1-naphthalenone by 2-phenyl-7-chloro-1,2,3,4-tetrahydro-1-naphthalenone, there is obtained 1-[p-(2-diethylaminoethoxy)phenyl] - 2 - phenyl-7-chloro-3,4-dihydronaphthalene and the hydrochloride thereof.

EXAMPLE 50

1-[p-(2-diethylaminoethoxy)phenyl]-2-phenyl-7-chloro-6-ethyl-3,4-dihydronaphthalene and the hydrochloride thereof Using the procedure described in Example 44, but replacing 2-phenyl-6-methoxy-1,2,3,4-tetrahydro-1-naphthalenone by 2-phenyl-7-chloro-6-ethyl-1,2,3,4-tetrahydro-1-naphthalenone, there is obtained 1-[p-(2-diethylaminoethoxy)phenyl] - 2 - phenyl-7-chloro-6-ethyl-3,4-dihydronaphthalene and the hydrochloride thereof.

EXAMPLE 51

1 - [p - (2 - diethylaminoethoxy)phenyl] - 2 - phenyl - 8-chloro-5-methoxy-3,4-dihydronaphthalene and the hydrochloride thereof Using the procedure described in Example 44, but replacing 2 - phenyl - 6 - methoxy - 1,2,3,4 - tetrahydro - 1-naphthalenone by 2-phenyl-8-chloro-5-methoxy-1,2,3,4-tetrahydro-1-naphthalenone, there is obtained 1-[p-(2-diethylaminoethoxy)phenyl] - 2 - phenyl - 8 - chloro - 5-methoxy-3,4-dihydronaphthalene and the hydrochloride thereof.

EXAMPLE 52

1 - [p - (2 - diethylaminoethoxy)phenyl] - 2 - phenyl - 7-ethyl-3,4-dihydronaphthalene and the hydrochloride thereof Using the procedure described in Example 44, but replacing 2 - phenyl - 6 - methoxy - 1,2,3,4 - tetrahydro - 1-naphthalenone by 2-phenyl-7-ethyl-1,2,3,4-tetrahydro-1-naphthalenone, there is obtained 1-[p-(2-diethylaminoethoxy)phenyl] - 2 - phenyl - 7 - ethyl - 3,4 - dihydronaphthalene and the hydrochloride thereof.

EXAMPLE 53

1 - [p - (2 - diethylaminoethoxy)phenyl] - 2 - phenyl - 5-fluoro-3,4-dihydronaphthalene and the hydrochloride thereof Using the procedure described in Example 44, but replacing 2 - phenyl - 6 - methoxy - 1,2,3,4 - tetrahydro - 1-naphthalenone by 2-phenyl-5-fluoro-1,2,3,4-tetrahydro-1-naphthalenone, there is obtained 1-[p-(2-diethylaminoethoxy)phenyl] - 2 - phenyl - 5 - fluoro - 3,4 - dihydronaphthalene and the hydrochloride thereof.

EXAMPLE 54

1 - [p - (2 - diethylaminoethoxy)phenyl] - 2 - phenyl - 6-allyl-7-methoxy-3,4-dihydronaphthalene and the hydrochloride thereof Using the procedure described in Example 44, but replacing 2 - phenyl - 6 - methoxy - 1,2,3,4 - tetrahydro - 1-naphthalenone by 2-phenyl-6-allyl-7-methoxy-1,2,3,4-tetrahydro-1-naphthalenone, there is obtained 1-[p-(2-diethylaminoethoxy)phenyl] - 2 - phenyl - 6 - allyl - 7-methoxy-3,4-dihydronaphthalene and the hydrochloride thereof.

EXAMPLE 55

1 - [p - (2 - diethylaminoethoxy)phenyl] - 2 - phenyl - 7-methylmercapto-3,4-dihydronaphthalene and the hydrochloride thereof Using the procedure described in Example 44, but replacing 2 - phenyl - 6 - methoxy - 1,2,3,4 - tetrahydro - 1-naphthalenone by 2-phenyl-7-methylmercapto-1,2,3,4-tetrahydro-1-naphthalenone, there is obtained 1-[p-(2-diethylaminoethoxy)phenyl] - 2 - phenyl - 7 - methylmercapto-3,4-dihydronaphthalene and the hydrochloride thereof.

EXAMPLE 56

1 - [p - (2 - diethylaminoethoxy)phenyl] - 2 - phenyl-7-phenylmercapto-3,4-dihydronaphthalene and the hydrochloride thereof Using the procedure described in Example 44, but replacing 2 - phenyl - 6 - methoxy - 1,2,3,4 - tetrahydro - 1-naphthalenone by 2-phenyl-7-phenylmercapto-1,2,3,4-tetrahydro-1-naphthalenone, there is obtained 1-[p-(2-diethylaminoethoxy)phenyl] - 2 - phenyl - 7 - methylmercapto-3,4-dihydronaphthalene and the hydrochloride thereof.

EXAMPLE 57

1 - [p - (2 - diethylaminoethoxy)phenyl] - 2 - phenyl - 7-phenoxy-3,4-dihydronaphthalene and the hydrochloride thereof Using the procedure described in Example 44, but replacing 2 - phenyl - 6 - methoxy - 1,2,3,4 - tetrahydro - 1-naphthalenone by 2-phenyl-7-phenoxy-1,2,3,4-tetrahydro-1-naphthalenone, there is obtained 1-[p-(2-diethylaminoethoxy)phenyl] - 2 - phenyl - 7 - phenoxy - 3,4 - dihydronaphthalene and the hydrochloride thereof.

EXAMPLE 58

1 - [p - (2 - diethylaminoethoxy)phenyl] - 2 - phenyl - 6-trifluoromethyl-3,4-dihydronaphthalene and the hydrochloride thereof Using the procedure described in Example 44, but replacing 2 - phenyl - 6 - methoxy - 1,2,3,4 - tetrahydro - 1-naphthalenone by 2-phenyl-6-trifluoromethyl-1,2,3,4-tetrahydro-1-naphthalenone, there is obtained 1-[p-(2-diethylaminoethoxy)phenyl] - 2 - phenyl - 6 - trifluoromethyl-3,4-dihydronaphthalene and the hydrochloride thereof.

EXAMPLE 59

1 - [p - (2 - diethylaminoethoxy)phenyl] - 2 - phenyl - 3-methyl-3,4-dihydronaphthalene and the hydrochloride thereof Using the procedure described in Example 44, but replacing 2 - phenyl - 6 - methoxy - 1,2,3,4 - tetrahydro - 1-naphthalenone by 2-phenyl-3-methyl-1,2,3,4-tetrahydro-1-naphthalenone, there is obtained 1-[p-(2-diethylaminoethoxy)phenyl] - 2 - phenyl - 3 - methyl - 3,4 - dihydronaphthalene and the hydrochloride thereof.

EXAMPLE 60

1 - [p - (2 - diethylaminoethoxy)phenyl] - 2 - phenyl - 3-ethyl-3,4-dihydronaphthalene and the hydrochloride thereof Using the procedure described in Example 44, but replacing 2 - phenyl - 6 - methoxy - 1,2,3,4 - tetrahydro - 1-naphthalenone by 2-phenyl-3-ethyl-1,2,3,4-tetrahydro-1-naphthalenone, there is obtained 1-[p-(2-diethylaminoethoxy)phenyl] - 2 - phenyl - 3 - ethyl - 3,4 - dihydronaphthalene and the hydrochloride thereof.

EXAMPLE 61

1 - [p - (2 - diethylaminoethoxy)phenyl] - 2 - phenyl-3-propyl-3,4-dihydronaphthalene and the hydrochloride thereof Using the procedure described in Example 44, but replacing 2 - phenyl - 6 - methoxy - 1,2,3,4 - tetrahydro - 1-naphthalenone by 2-phenyl-3-propyl-1,2,3,4-tetrahydro-1-naphthalenone, there is obtained 1-[p-(2-diethylaminoethoxy)phenyl] - 2 - phenyl - 3 - propyl - 3,4 - dihydronaphthalene and the hydrochloride thereof.

EXAMPLE 62

1 - [p - (2 - diethylaminoethoxy)phenyl] - 2 - (2 - bromophenyl)-3,4-dihydronaphthalene and the hydrochloride thereof Using the procedure described in Example 44, but replacing 2 - phenyl - 6 - methoxy - 1,2,3,4 - tetrahydro - 1-naphthalenone by 2-(2-bromophenyl)-1,2,3,4-tetrahydro-1-naphthalenone, there is obtained 1-[p-(2-diethylaminoethoxy)phenyl] - 2 - (2 - bromophenyl) - 3,4 - dihydronaphthalene and the hydrochloride thereof.

EXAMPLE 63

1 - [p - (2 - diethylaminoethoxy)phenyl] - 2 - (5 - bromo-2-methoxyphenyl)-3,4-dihydronaphthalene and the hydrochloride thereof Using the procedure described in Example 44, but replacing 2 - phenyl - 6 - methoxy - 1,2,3,4 - tetrahydro - 1-naphthalenone by 2-(5-bromo-2-methoxyphenyl)-1,2,3,4-tetrahydro-1-naphthalenone, there is obtained 1-[p-(2-diethylaminoethoxy)phenyl] - 2 - (5 - bromo - 2 - methoxyphenyl)-3,4-dihydronaphthalene and the hydrochloride thereof.

EXAMPLE 64

1 - [p - (2 - diethylaminoethoxy)phenyl] - 2 - (3 - chlorophenyl)-3,4-dihydronaphthalene and the hydrochloride thereof Using the procedure described in Example 44, but replacing 2-phenyl - 6 - methoxy-1,2,3,4-tetrahydro-1-naphthalenone by 2-(3-chlorophenyl) - 1,2,3,4 - tetrahydro-1-naphthalenone, there is obtained 1-[p-(2-diethylaminoethoxy)phenyl] - 2 - (3 - chlorophenyl)-3,4-dihydronaphthalene and the hydrochloride thereof.

EXAMPLE 65

1-[p-(2 - diethylaminoethoxy)phenyl] - 2 - (2-chloro-6-fluorophenyl) - 3,4 - dihydronaphthalene and the hydrochloride thereof Using the procedure described in Example 44, but replacing 2-phenyl - 6 - methoxy-1,2,3,4-tetrahydro-1-naphthalenone by 2-(2-chloro-6-fluorophenyl) - 1,2,3,4-tetrahydro-1-naphthalenone, there is obtained 1-[p-(2-diethylaminoethoxy)phenyl]-2-(2-chloro - 6 - fluorophenyl)-3,4-dihydronaphthalene and the hydrochloride thereof.

EXAMPLE 66

1-[p-(2-diethylaminoethoxy)phenyl] - 2 - (3,5-dibromo-2-ethoxyphenyl) - 3,4 - dihydronaphthalene and the hydrochloride thereof Using the procedure described in Example 44, but replacing 2-phenyl - 6 - methoxy - 1,2,3,4 - tetrahydro-1-naphthalenone by 2-(3,5 - dibromo - 2 - ethoxyphenyl)-1,2,3,4-tetrahydro - 1 - naphthalenone, there is obtained 1-[p-(2-diethylaminoethoxy)phenyl]-2-(3,5 - dibromo-2-ethoxyphenyl)-3,4-dihydronaphthalene and the hydrochloride thereof.

EXAMPLE 67

1-[p-(2-diethylaminoethoxy)phenyl] - 2 - (2,3 - dichlorophenyl) - 3,4 - dihydronaphthalene and the hydrochloride thereof Using the procedure described in Example 44, but replacing 2-phenyl - 6 - methoxy-1,2,3,4-tetrahydro-1-naphthalenone by 2-(2,3 - dichlorophenyl) - 1,2,3,4 - tetrahydro - 1 - naphthalenone, there is obtained 1-[p-(2-diethylaminoethoxy)phenyl] - 2 - (2,3 - dichlorophenyl)-3,4-dihydronaphthalene and the hydrochloride thereof.

EXAMPLE 68

1-[p-(2-diethylaminoethoxy)phenyl] - 2 - p - tolyl-3,4-dihydronaphthalene and the hydrochloride thereof Using the procedure described in Example 44, but replacing 2-phenyl - 6 - methoxy - 1,2,3,4 - tetrahydro-1-naphthalenone by 2-p-tolyl - 1,2,3,4 - tetrahydro-1-naphthalenone, there is obtained 1-[p-(2-diethylaminoethoxy)phenyl]-2-p-tolyl-3,4-dihydronaphthalene and the hydrochloride thereof.

EXAMPLE 69

1-[p-(2-diethylaminoethoxy)phenyl] - 2 - (2,6 - dimethylphenyl) - 3,4 - dihydronaphthalene and the hydrochloride thereof Using the procedure described in Example 44, but replacing 2-phenyl - 6 - methoxy - 1,2,3,4 - tetrahydro-1-naphthalenone by 2-(2,6-dimethylphenyl) - 1,2,3,4-tetrahydro-1-naphthalenone, there is obtained 1-[p-(2-diethylaminoethoxy)phenyl] - 2 - (2,6 - dimethylphenyl)-3,4-dihydronaphthalene and the hydrochloride thereof.

EXAMPLE 70

1-[p-(2-diethylaminoethoxy)phenyl] - 2 - (4 - methoxyphenyl) - 3,4 - dihydronaphthalene and the hydrochloride thereof Using the procedure described in Example 44, but replacing 2-phenyl-6-methoxy - 1,2,3,4 - tetrahydro-1-naphthalenone by 2 - (4 - methoxyphenyl)-1,2,3,4-tetrahydro-1-naphthalenone, there is obtained 1-[p-(2-diethylaminoethoxy)phenyl]-2-(4-methoxyphenyl) - 3,4 - dihydronaphthalene and the hydrochloride thereof.

EXAMPLE 71

1-[p-(2-diethylaminoethoxy)phenyl] - 2 - (3,4 - diethoxyphenyl)-3,4-dihydronaphthalene and the hydrochloride thereof Using the procedure described in Example 44, but replacing 2-phenyl - 6 - methoxy - 1,2,3,4 - tetrahydro-1-naphthalenone by 2 - (3,4 - diethoxyphenyl)-1,2,3,4-tetrahydro-1-naphthalenone, there is obtained 1-[p-(2-diethylaminoethoxy)phenyl] - 2 - (3,4 - diethoxyphenyl) - 3,4-dihydronaphthalene and the hydrochloride thereof.

EXAMPLE 72

1-[p-(2-diethylaminoethoxy)phenyl] - 2 - (4 - tert.-amyloxyphenyl) - 3,4 - dihydronaphthalene and the hydrochloride thereof Using the procedure described in Example 44, but replacing 2 - phenyl - 6 - methoxy - 1,2,3,4 - tetrahydro - 1- naphthalenone by 2 - (4 - tert. - amyloxyphenyl) - 1,2,3,4-tetrahydro - 1 - naphthalenone, there is obtained 1-[p-(2-diethylaminoethoxy)phenyl] - 2 - (4 - tert. - amyloxyphenyl) - 3,4 - dihydronaphthalene and the hydrochloride thereof.

EXAMPLE 73

1-[p-(2-diethylaminoethoxy)phenyl] - 2 - (4 - methylmercaptophenyl) - 3,4 - dihydronaphthalene and the hydrochloride thereof Using the procedure described in Example 44, but replacing 2 - phenyl - 6 - methoxy - 1,2,3,4 - tetrahydro - 1-naphthalenone by 2-(4-methylmercaptophenyl) - 1,2,3,4-tetrahydro - 1 - naphthalenone, there is obtained 1-[p-(2-diethylaminoethoxy)phenyl] - 2 - (4 - methylmercaptophenyl)-3,4-dihydronaphthalene and the hydrochloride thereof.

EXAMPLE 74

1-[p-(2-diethylaminoethoxy)phenyl] - 2 - (4 - phenylmercaptophenyl) - 3,4 - dihydronaphthalene and the hydrochloride thereof Using the procedure described in Example 44, but replacing 2-phenyl - 6 - methoxy - 1,2,3,4 - tetrahydro-1-naphthalenone by 2-(4-phenylmercaptophenyl) - 1,2,3,4-tetrahydro - 1 - naphthalenone, there is obtained 1-[p-(2-diethylaminoethoxy)phenyl] - 2 - (4 - phenylmercaptophenyl) - 3,4 - dihydronaphthalene and the hydrochloride thereof.

EXAMPLE 75

1-[p-(2-diethylaminoethoxy)phenyl] - 2 - (4 - phenoxyphenyl) - 3,4 - dihydronaphthalene and the hydrochloride thereof Using the procedure described in Example 44, but replacing 2-phenyl - 6 - methoxy - 1,2,3,4 - tetrahydro-1-naphthalenone by 2 - (4 - phenoxyphenyl) - 1,2,3,4 - tetrahydro-1-naphthalenone, there is obtained 1-[p-(2-diethylaminoethoxy)phenyl] - 2 - (4 - phenoxyphenyl) - 3,4 - dihydronaphthalene and the hydrochloride thereof.

EXAMPLE 76

1-[p-(2 - diethylaminoethoxy)phenyl] - 2 - (4 - allylphenyl) - 3,4 - dihydronaphthalene and the hydrochloride thereof Using the procedure described in Example 44, but replacing 2-phenyl - 6 - methoxy-1,2,3,4 - tetrahydro-1-naphthalenone by 2-(4-allylphenyl) - 1,2,3,4 - tetrahydro-1-naphthalenone, there is obtained 1-[p-(2-diethylaminoethoxy)phenyl] - 2 - (4 - allyl - phenyl)-3,4-dihydronaphthalene and the hydrochloride thereof.

EXAMPLE 77

1-[p-(2-diethylaminoethoxy)phenyl] - 2 - (4 - trifluoromethylphenyl) - 3,4 - dihydronaphthalene and the hydrochloride thereof Using the procedure described in Example 44, but replacing 2-phenyl - 6 - methoxy - 1,2,3,4 - tetrahydro-1-naphthalenone by 2-(4-trifluoromethylphenyl) - 1,2,3,4-tetrahydro-1-naphthalenone, there is obtained 1-[p-(2-diethylaminoethoxy)phenyl] - 2 - (4-trifluoromethylphenyl)-3,4 - dihydronaphthalene and the hydrochloride thereof.

EXAMPLE 78

1-[p-(2 - dimethylaminoethoxy)phenyl] - 2 - phenyl-6-methoxy-3,4-dihydronaphthalene and the hydrochloride thereof Using the procedure described in Example 44, but replacing p-(2-diethylaminoethoxy)bromobenzene by p-(2-dimethylaminoethoxy)bromobenzene, there is obtaind 1-[p-(2-dimethylaminoethoxy)phenyl] - 2 - phenyl-6-methoxy-3,4-dihydronaphthalene and the hydrochloride thereof.

EXAMPLE 79

1 - [p - (2 - diethylaminopropoxy)phenyl] - 2 - phenyl - 6-methoxy-3,4-dihydronaphthalene and the hydrochloride thereof Using the procedure described in Example 44, but replacing p-(2-diethylaminoethoxy)bromobenzene by p-(2-diethylaminopropoxy)bromobenzene, there is obtained 1-[p-(2-diethylaminopropoxy)phenyl] - 2 - phenyl-6-methoxy-3,4-dihydronaphthalene and the hydrochloride thereof.

EXAMPLE 80

1 - [p - (2 - dibutylaminoethoxy)phenyl] - 2 - phenyl - 6-methoxy-3,4-dihydronaphthalene and the hydrochloride thereof Using the proceduce described in Example 44, but replacing p-(2-diethylaminoethoxy)bromobenzene by p-(2-dibutylaminoethoxy)bromobenzene, there is obtained 1-[p-(2-dibutylaminoethoxy)phenyl]-2-phenyl - 6 - methoxy-3,4-dihydronaphthalene and the hydrochloride thereof.

EXAMPLE 81

1 - [p - (2 - N - methyl - N - ethylaminoethoxy)phenyl]-2 - phenyl - 6 - methoxy - 3,4 - dihydronaphthalene and the hydrochloride thereof Using the procedure described in Example 44, but replacing p-(2-diethylaminoethoxy)bromobenzene by p-(2-N-methyl - N - ethylaminoethoxy)bromobenzene, there is obtained 1-[p-(2-N-methyl-N-ethylaminoethoxy)phenyl]-2-phenyl-6-methoxy-3,4-dihydronaphthalene and the hydrochloride thereof.

EXAMPLE 82

1 - [p - (3 - diethylaminobutoxy)phenyl] - 2 - phenyl - 6-methoxy-3,4-dihydronaphthalene and the hydrochloride thereof Using the procedure described in Example 44, but replacing p-(2-diethylaminoethoxy)bromobenzene by p-(3-diethylaminobutoxy)bromobenzene, there is obtained 1-[p-(3-diethylaminobutoxy)phenyl]-2-phenyl-6 - methoxy-3,4-dihydronaphthalene and the hydrochloride thereof.

EXAMPLE 83

1 - [p - (5 - dimethylaminopentoxy)phenyl] - 2 - phenyl-6-methoxy-3,4-dihydronaphthalene and the hydrochloride thereof Using the procedure described in Example 44, but replacing p-(2-diethylaminoethoxy)bromobenzene by a p-(5 - dimethylaminopentoxy)bromobenzene, there is obtained 1-[p - (5-dimethylaminopentoxy)phenyl]-2-phenyl-6-methoxy-3,4-dihydronaphthalene and the hydrochloride thereof.

EXAMPLE 84

1 - [p - (2 - diethylaminopentoxy)phenyl] - 2 - phenyl - 6-methoxy-3,4-dihydronaphthalene and the hydrochloride thereof Using the procedure described in Example 44, but replacing p-(2-diethylaminoethoxy)bromobenzene by a p-(2-diethylaminopentoxy)bromobenzene, there is obtained 1-[p-(2 - diethylaminopentoxy)phenyl]-2-phenyl-6-methoxy-3,4-dihydronaphthalene and the hydrochloride thereof.

EXAMPLE 85

1 - [p - (6 - dimethylaminohexyloxy)phenyl] - 2 - phenyl-6-methoxy-3,4-dihydronaphthalene and the hydrochloride thereof Using the procedure described in Example 44, but replacing p-(2-diethylaminoethoxy)bromobenzene by p-(6-dimethylaminohexyloxy)bromobenzene, there is obtained 1 - [p - (6 - dimethylaminohexyloxy)phenyl]-2-phenyl-6-methoxy-3,4-dihydronaphthalene and the hydrochloride thereof.

EXAMPLE 86

1 - [p - (2 - pyrrolidinoethoxy)phenyl] - 2 - phenyl - 6-methoxy-3,4-dihydronaphthalene and the hydrochloride thereof Using the procedure described in Example 44, but replacing p-(2-diethylaminoethoxy)bromobenzene by p-(2-pyrrolidinoethoxy)bromobenzene, there is obtained 1-[p-(2-pyrrolidinoethoxy)phenyl]-2-phenyl - 6 - methoxy-3,4-dihydronaphthalene and the hydrochloride thereof, which latter has a melting point of 168 to 172° C.

EXAMPLE 87

1 - {p - [3 - (2,2 - dimethylpyrrolidino)propoxy]phenyl}-2 - phenyl - 6 - methoxy - 3,4 - dihydronaphthalene and the hydrochloride thereof Using the procedure described in Example 44, but replacing p-(2-diethylaminoethoxy)bromobenzene by p-[3-(2,2-dimethylpyrrolidino)propoxy]bromobenzene, there is obtained 1 - {p - [3 - (2,2-dimethylpyrrolidino)propoxy]phenyl}-2-phenyl-6-methoxy-3,4-dihydronaphthalene and the hydrochloride thereof.

EXAMPLE 88

1 - [p - (2 - piperidinoethoxy)phenyl] - 2 - phenyl - 6-methoxy-3,4-dihydronaphthalene and the hydrochloride thereof Using the procedure described in Example 44, but replacing p-(2-diethylaminoethoxy)bromobenzene by p-(2-piperidinoethoxy)bromobenzene, there is obtained 1-[p-(2-piperidinoethoxy)phenyl] - 2-phenyl-6-methoxy-3,4-dihydronaphthalene and the hydrochloride thereof, which latter has a melting point of 216 to 219° C.

EXAMPLE 89

1 - [p - (2 - morpholinoethoxy)phenyl] - 2 - phenyl - 6-methoxy-3,4-dihydronaphthalene and the hydrochloride thereof Using the procedure described in Example 44, but replacing p-(2-diethylaminoethoxy)bromobenzene by p-(2-morpholinoethoxy)bromobenzene, there is obtained 1-[p-(2-morpholinoethoxy)phenyl]-2-phenyl - 6 - methoxy-3,4-dihydronaphthalene and the hydrochloride thereof, which latter has a melting point of 200 to 204° C.

EXAMPLE 90

1 - {p-[2 - (1' - methyl - 4'-piperazino)ethoxy] - phenyl}-2 - phenyl - 6 - methoxy - 3,4 - dihydronaphthalene and the hydrochloride thereof Using the procedure described in Example 44, but replacing p-(2-diethylaminoethoxy)bromobenzene by p-[2-(1' - methyl - 4' - piperazino)ethoxy]bromobenzene, there is obtained 1-{p-[2-(1'-methyl-4'-piperazino) ethoxy] phenyl}-2-phenyl-6-methoxy-3,4-dihydronaphthalene and the hydrochloride thereof.

EXAMPLE 91

1 - [p-(2 - hexamethyleneiminoethoxy)phenyl] - 2 - phenyl-6-methoxy-3,4-dihydronaphthalene and the hydrochloride thereof Using the procedure described in Example 44, but replacing p-(2-diethylaminoethoxy)bromobenzene by p-(2-hexamethyleneiminoethoxy)bromobenzene, there is obtained 1-[p - (2 - hexamethyleneiminoethoxy)phenyl]-2-phenyl-6-methoxy-3,4-dihydronaphthalene and the hydrochloride thereof.

EXAMPLE 92

1 - [p - (2 - homopiperazinoethoxy)phenyl] - 2 - phenyl-6-methoxy-3,4-dihydronaphthalene and the hydrochloride thereof Using the procedure described in Example 44, but replacing p-(2-diethylaminoethoxy)bromobenzene by p-(2-homopiperazinoethoxy)bromobenzene, there is obtained 1 - [p - (2 - homopiperazinoethoxy)phenyl] - 2 - phenyl-6-methoxy-3,4-dihydronaphthalene and the hydrochloride thereof.

EXAMPLE 93

1 - [p - (2 - homomorpholinoethoxy)phenyl] - 2 - phenyl-6-methoxy-3,4-dihydronaphthalene and the hydrochloride thereof Using the procedure described in Example 44, but replacing p-(2-diethylaminoethoxy)bromobenzene by p-(2-homomorpholinoethoxy)bromobenzene, there is obtained 1 - [p - (2 - homomorpholinoethoxy)phenyl] - 2 - phenyl-6-methoxy-3,4-dihydronaphthalene and the hydrochloride thereof.

EXAMPLE 94

1 - [p - (2 - diethylaminoethoxy)phenyl] - 2 - phenyl-6-hydroxy-3,4-dihydronaphthalene and the hydrochloride thereof (A) 2 - phenyl - 6 - hydroxy - 1,2,3,4 - tetrahydro - 1-naphthalenone.—Heating a mixture of 2-phenyl-6-methoxy-1,2,3,4-tetrahydro-1-naphthalenone with aluminum bromide in benzene according to the procedure described in Sam. J. Am. Chem. Soc., 82, 5205, 1960, yields 2-phenyl - 6 - hydroxy - 1,2,3,4 - tetrahydro - 1 - naphthalenone in the form of a crystalline compound.

(B) 2 - phenyl - 6 - (2 - tetrahydropyranyloxy) - 1,2,3,4-tetrahydro-1-naphthalenone.—A solution of 2-phenyl-6-hydroxy-1,2,3,4-tetrahydro-1-naphthalenone in ether is treated with an equimolar quantity of 2,3-dihydropyran and one drop of concentrated hydrochloric acid. The mixture so obtained is allowed to stand for several hours, washed with very dilute aqueous sodium hydroxide solution, then with water and taken to dryness. There is thus obtained 2-phenyl-6-(2-tetrahydropyranyloxy)-1,2,3,4-tetrahydro-1-naphthalenone.

(C) 1 - [p - (2 - diethylaminoethoxy)phenyl] - 2-phenyl-6-hydroxy-3,4-dihydronaphthalene and the hydrochloride thereof.—Using the procedure described in Example 44, but replacing 2-phenyl-6-methoxy-1,2,3,4-tetrahydro-1-naphthalenone by 2-phenyl-6-(2-tetrahydropyranyloxy)-1,2,3,4-tetrahydro-1-naphthalenone and allowing the 0.5 N hydrochloric acid extract obtained in the working up to stand for several hours to enable the hydrolysis of the tetrahydropyranyl ether to proceed to completion before finally extracting with methylene chloride, there is obtained 1-[p-(2-diethylaminoethoxy)phenyl]-2-phenyl-6-hydroxy-3,4-dihydronaphthalene hydrochloride. The latter compound is converted to the corresponding free base using the procedure described in the last paragraph of Example 44.

EXAMPLE 95

1 - [p - (2 - diethylaminoethoxy)phenyl] - 2 - phenyl-6-allyloxy-3,4-dihydronaphthalene and the hydrochloride thereof (A) 2 - phenyl - 6 - allyloxy - 1,2,3,4 - tetrahydro - 1-naphthalenone.—A solution of 2-phenyl-6-hydroxy-1,2,3,4-tetrahydro-1-naphthalenone [Example 94, part A] in methanol containing a slight excess of sodium methoxide is treated slowly with stirring with an excess of allyl chloride. When the addition is complete the mixture is heated under reflux for several hours before being cooled and poured into water. The resulting mixture is extracted with ether and the ethereal extract is washed with aqueous sodium hydroxide solution and with water before being evaporated to dryness to yield 2-phenyl-6-allyloxy-1,2,3,4-tetrahydro-1-naphthalenone.

(B) 1 - [p - (2 - diethylaminoethoxy)phenyl] - 2-phenyl-6-allyloxy-3,4-dihydronaphthalene and the hydrochloride thereof.—Using the procedure described in Example 44, but replacing 2-phenyl-6-methoxy-1,2,3,4-tetrahydro-1-naphthalenone by 2-phenyl-6-allyloxy-1,2,3,4-tetrahydro-1-naphthalenone, there is obtained 1-[p-(2-diethylaminoethoxy)phenyl] - 2 - phenyl - 6 - allyloxy-3,4-dihydronaphthalene and the hydrochloride thereof.

EXAMPLE 96

1 - [p - (2 - diethylaminoethoxy)phenyl] - 2 - phenyl-6-methoxy-3,4-dihydronaphthalene methiodide A solution of 1 g. of 1-[p-(2-diethylaminoethoxy)phenyl] - 2 - phenyl - 6 - methoxy - 3,4 - dihydronaphthalene in 12 ml. of acetonitrile is cooled in ice. To the cooled solution is added 1.5 ml. of methyl iodide and the mixture is allowed to stand overnight before being poured into 100 ml. of ether. The solid which separates is isolated by filtration and recrystallized from a mixture of ethyl acetate and ether. There is thus obtained 1-[p-(2-diethylaminoethoxy)phenyl] - 2 - phenyl - 6 - methoxy-3,4-dihydronaphthalene methiodide in the form of a crystalline solid.

Similarly, using the above procedure, but replacing methyl iodide by ethyl bromide, propyl bromide, allyl bromide, and benzyl bromide, there are obtained the ethobromide, propyl bromide, allyl bromide, and benzyl bromide, respectively, of 1 - [p - (2 - diethylaminoethoxy)phenyl]-2-phenyl-6-methoxy-3,4-dihydronaphthalene.

Similarly, using the procedure described in Example 96, but replacing 1-[p - (2 - diethylaminoethoxy)phenyl]-2-phenyl-6-methoxy-3,4-dihydronaphthalene by any of the free bases prepared as described in Examples 45 to 95, inclusive, there are prepared the corresponding methiodides and like quaternary ammonium salts.

EXAMPLE 97

1 - [p - (2 - diethylaminoethoxy)phenyl] - 2 - phenyl-6-methoxy-3,4-dihydronaphthalene N-oxide and the hydrochloride thereof To a solution of 1-[p-(2-diethylaminoethoxy)phenyl]-2-phenyl-6-methoxy-3,4-dihydronaphthalene in 50 ml. of absolute ethanol is added an equimolar quantity of 30% hydrogen peroxide. The mixture is allowed to stand for 4 days at room temperature, at the end of which time the mixture is shaken with 0.5 g. of platinum oxide until a test for peroxide is negative. The mixture is then filtered and the filtrate is evaporated to dryness under reduced pressure. The residue is recrystallized from a mixture of chloroform and ethyl acetate. There is thus obtained 1-[p-(2 - diethylaminoethoxy)phenyl] - 2 - phenyl-6-methoxy-3,4-dihydronaphthalene N-oxide.

The N-oxide so obtained is converted to the corresponding hydrochloride by dissolving the N-oxide in ether and treating the ether solution with an excess of a saturated solution of hydrogen chloride in ether. The solid which separates is isolated by filtration. There is thus obtained 1 - [p - (2 - diethylaminoethoxy)phenyl] - 2-phenyl-6-methoxy-3,4-dihydronaphthalene N-oxide hydrochloride.

Using the above procedure, but replacing 1-[p-(2-diethylaminoethoxy)phenyl] - 2 - phenyl-6-methoxy-3,4-dihydronaphthalene by any of the free bases prepared as described in Examples 45 to 95, inclusive, there are obtained the corresponding N-oxides and the hydrochlorides thereof.

EXAMPLE 98

Commercially available No. 6 size chicken feed pellets of the following composition are sprayed with 2-[p-(6-methoxy - 2 - phenylinden - 3 - yl)-phenoxy]triethylamine hydrochloride dissolved in 30% ethanol-water mixtures in an amount sufficient to provide approximately 6.5 mg. of active ingredient per pellet:

|  | Percent |
|---|---|
| Ground yellow corn | 61 |
| 50% soybean meal | 13 |
| Menhaden fish meal | 2 |
| Meat scraps | 7 |
| Alfalfa | 3 |
| Midlings | 3 |
| Oats | 3 |
| Vitamins and minerals | 8 |

When such pellets are placed in farm areas frequented by red-winged blackbirds, quail, house sparrows, starlings, or pigeons, their numbers and destructiveness are substantially reduced. For the red-winged, best results are obtained during the breeding season from late April to June. The pellets are distributed in an amount related directly to the number of birds populating an area and their normal food consumption. The pellets are replaced as consumed until the number of birds reach a desired level. They can then be discontinued until the number of birds reach the nuisance level and then the whole cycle is repeated.

EXAMPLE 99

Capsules containing 250 mgs. of 2 - [p - (6 - methoxy-2-phenylinden-3-yl)-phenoxy]triethylamine hydrochloride or 175 mgs. of 1-{2-[p-(3,4-dihydro-6-methoxy-2-phenyl-1-naphthyl)phenoxy]ethyl}-pyrrolidine hydrochloride can be prepared by conventional means. The capsules can be inserted into dead fish and the fish can be deposited in feeding areas frequented by gulls at the rate of one capsule-containing fish per gull per day for 10 days. When so administered directly to fixed numbers of herring gulls in controlled tests, the capsules will substantially reduce the numbers of gulls as compared to untreated controls. Hazards to aviation, especially around airfields located along the coastal areas of New England, can be reduced by this method.

EXAMPLE 100

2 - [ - (6 - methoxy-2-phenylinden-3-yl)-phenoxy]triethylamine hydrochloride, 2-[p-(3,4-dihydro-6-methoxy-2 - phenyl-1-naphthyl)phenoxy]triethylamine hydrochloride and 1 - {2 - [p - (3,4-dihydro-6-methoxy-2-phenyl-1-naphthyl)phenoxy]ethyl}-pyrrolidine hydrochloride can each be dissolved in 40% isopropanol in water and sprayed on rice or sorghum seeds in amounts sufficient to provide a concentration of 5% by weight of the active ingredient in the grain. The grain can then be spread in agricultural communities to control the numbers and reduce the destructiveness of red-winged blackbirds, grackles, weaverbirds, sparrows and finches, all of which are known to be voracious seed eaters and therefore destructive to farmers' crops.

EXAMPLE 101

Each of the compounds of Examples 1–97 can be substituted in the compositions and methods of Examples 98–100 to accomplish the same results.

What is claimed is:

1. The method of controlling the number of birds and rodents in an area which comprises the placement of a feed composition containing from about 0.1 to about 10% of a member selected from the group consisting of (a) the free bases, (b) the pharmacologically acceptable acid addition salts, (c) the N-oxides, (d) the N-oxide pharmacologically acceptable acid addition salts and (e) the quaternary ammonium salts selected from the group consisting of lower-alkyl quaternary ammonium halides, lower-alkenyl quaternary ammonium halides, di(lower-alkyl) quaternary ammonium sulfates, aralkyl quaternary ammonium halides, and lower-alkyl quaternary arylsulfonates of compounds having the formula:

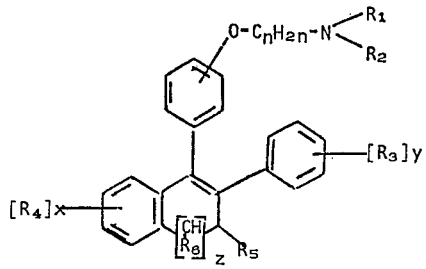

wherein $R_1$ and $R_2$ are selected from the class consisting of lower-alkyl from 1 to 8 carbon atoms, inclusive, and, together with the nitrogen atom, a member selected from the class consisting of pyrrolidino, 2-methyl-pyrrolidino, 2,2-dimethyl-pyrrolidino, piperazino, 4-methyl-piperazino, 2,4-dimethyl-piperazino, morpholino, piperidino, 2-methylpiperidino, 3-methyl-piperidino, hexamethyleneimino, homopiperazino and homomorpholino, $R_3$ and $R_4$ are selected from the class consisting of trifluoromethyl, lower-alkyl, lower-alkenyl, hydroxy, lower-alkoxy, lower-alkenyloxy, aryloxy from 6 to 12 carbon atoms, inclusive, halogen, lower-alkylmercapto and arylmercapto from 6 to 12 crabon atoms, inclusive, $C_nH_{2n}$ represents an alkylene group from 2 to 6 carbon atoms, inclusive, $x$ and $y$ are integers from 0 to 4, inclusive, $R_5$ and $R_6$ are selected from the class consisting of hydrogen and lower-alkyl, and $z$ is an integer from 0 to 1, inclusive, in the area populated by such birds and rodents so that said birds and rodents ingest an amount sufficient to reduce to and maintain a desired population by sublethal means.

2. The method of controlling the number of birds in an area which comprises the placement of a food composition containing from about 0.1 to about 10% of a member selected from the group consisting of (a) the free bases, (b) the pharmacologically acceptable acid addition salts, (c) the N-oxides, (d) the N-oxide pharmacologically acceptable acid addition salts and (e) the quaternary ammonium salts selected from the group consisting of lower-alkyl quaternary ammonium halides, lower-alkenyl quaternary ammonium halides, di(lower-alkyl) quaternary ammonium sulfates, aralkyl quaternary ammonium halides, and lower-alkyl quaternary arylsulfonates of compounds having the formula:

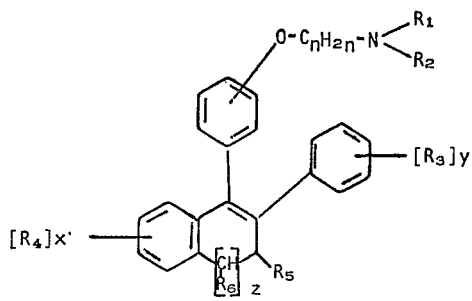

wherein $R_1$ and $R_2$ are selected from the class consisting of lower-alkyl from 1 to 8 carbon atoms, inclusive, and, together with the nitrogen atom, a member selected from the class consisting of pyrrolidino, 2-methylpyrrolidino, 2,2-dimethylpyrrolidino, piperazino, 4-methylpiperazino, 2,4-dimethylpiperazino, morpholino, piperidino, 2-methylpiperidino, 3-methylpiperidino, hexamethyleneamino, homopiperazino, and homomorpholino, $R_3$ and $R_4$ are selected from the class consisting of trifluoromethyl, lower-alkyl, lower-alkenyl, hydroxy, lower-alkoxy, lower-alkenyloxy, aryloxy from 6 to 12 carbon atoms, inclusive, halogen, lower-alkylmercapto, and arylmercapto from 6 to 12 carbon atoms, inclusive, $C_nH_{2n}$ represents an alkylene group from 2 to 6 carbon atoms, inclusive, $x$ and $y$ are integers from 0 to 4, inclusive, $R_5$ and $R_6$ are selected from the class consisting of hydrogen and lower-alkyl, and $z$ is an integer from 0 to 1, inclusive, in the area populated by such birds so that said birds ingest an amount sufficient to reduce to and maintain a desired population by sublethal means.

3. The method of claim 2 wherein the active ingredient of the feed composition is 2-[p-(6-methoxy-2-phenylinden-3-yl)-phenoxy]triethylamine hydrochloride.

4. The method of claim 2 wherein the active ingredient of the feed composition is 1-{2-[p-(3,4-dihydro-6-methoxy - 2 - phenyl - 1 - naphthyl)phenoxy]ethyl}-pyrrolidone hydrochloride.

5. The method of claim 2 wherein the active ingredient of the feed composition is 2-[p-(3,4-dihydro-6-methoxy-2-phenyl - 1 - naphthyl)phenoxy]triethylamine hydrochloride.

References Cited

UNITED STATES PATENTS 3,164,607    1/1965    Lednicer _____ 260—326.5
3,274,213    9/1966    Lednicer _____ 260—326.5

ALBERT T. MEYERS, Primary Examiner

JEROME D. GOLDBERG, Assistant Examiner

U.S. Cl. X.R.

424—244, 248, 250, 267, 329, 330